United States Patent [19]

Kokubo et al.

[11] Patent Number: 5,024,459
[45] Date of Patent: Jun. 18, 1991

[54] PRESSURE CONTROL SYSTEM FOR SUSPENSION

[75] Inventors: Kouichi Kokubo, Nagoya; Toshiaki Hamada, Toyota; Shinichi Tagawa, Toyota; Nobuyasu Suzumura, Toyota; Shuuichi Buma, Toyota; Toshio Aburaya, Toyota; Toshio Onuma; Kunihito Sato, both of Susono; Takashi Yonekawa, Mishima; Masaki Kawanishi, Toyota; Hiroyuki Ikemoto, Susono; Kaoru Ohashi, Okazaki, all of Japan

[73] Assignees: Toyota Jidosha Kabushiki Kaisha, Toyota; Aisin Seiki Kabushiki Kaisha, Kariya, both of Japan

[21] Appl. No.: 457,957

[22] Filed: Dec. 27, 1989

[30] Foreign Application Priority Data

Dec. 28, 1988 [JP] Japan .................. 63-331041
Feb. 13, 1989 [JP] Japan .................. 1-33462
Aug. 28, 1989 [JP] Japan .................. 1-221240
Aug. 31, 1989 [JP] Japan .................. 1-226222

[51] Int. Cl.$^5$ .............................................. B60G 17/00
[52] U.S. Cl. ................................................... 280/707
[58] Field of Search ......................................... 280/707

[56] References Cited

U.S. PATENT DOCUMENTS 4,717,173 1/1988 Sugasawa et al. ............ 280/707
4,730,843 3/1988 Tanaka et al. ................ 280/707
4,763,222 8/1988 Heaston et al. ............... 280/707
4,765,649 8/1988 Ikemoto et al. .............. 280/707
4,787,650 11/1988 Doi et al. ...................... 280/707

FOREIGN PATENT DOCUMENTS 63-106133 5/1988 Japan .

Primary Examiner—Kenneth R. Rice
Attorney, Agent, or Firm—Burns, Doane, Swecker & Mathis

[57] ABSTRACT

A suspension pressure control system applies a pressure which is proportional to a current level supplied to a solenoid of a pressure control valve to a shock absorber associated with a suspension from the valve. When a pressure in a high pressure line which feeds a high pressure to the pressure control valve falls (rises), the pressure applied to the suspension is decreased (increased). Accordingly, the pressure in the high pressure line is detected by a sensor, and if it is low (high), the current level of the pressure control valve is corrected to a high value (low value). In order to prevent an abnormal pressure rise in the suspension which may be caused by an excessive pressure rise in the high pressure line during an idling operation of an engine, a correction which responds to the pressure of the high pressure line is chosen large when a vehicle speed is equal to zero or very low. In order to prevent an abnormality from occurring in the correction of the pressure which is attributable to an errorneous detected value during a failure of operation of sensor, such detected value is determined to be faulty, and in the event a fault occurred, the correction is modified to a given volume (0) which is allocated to a standard pressure in the high pressure line.

12 Claims, 20 Drawing Sheets

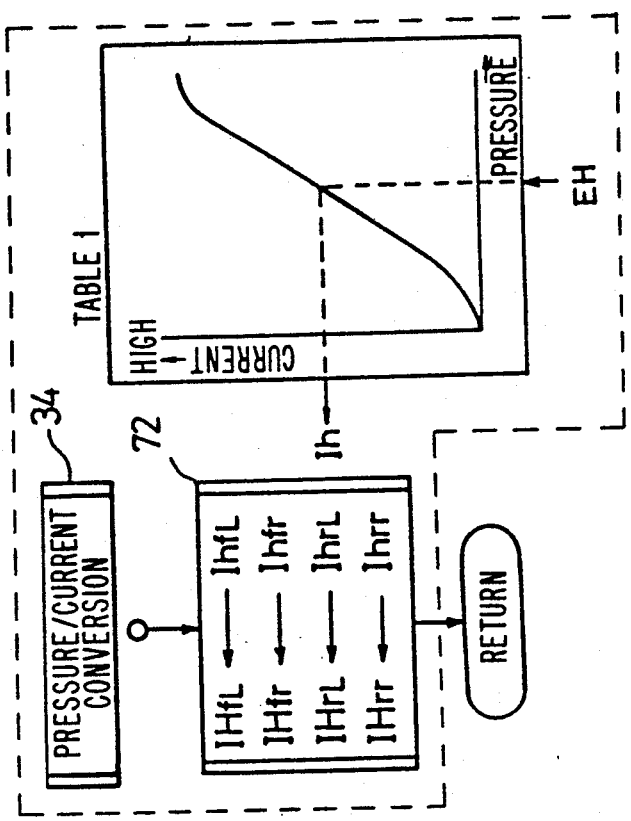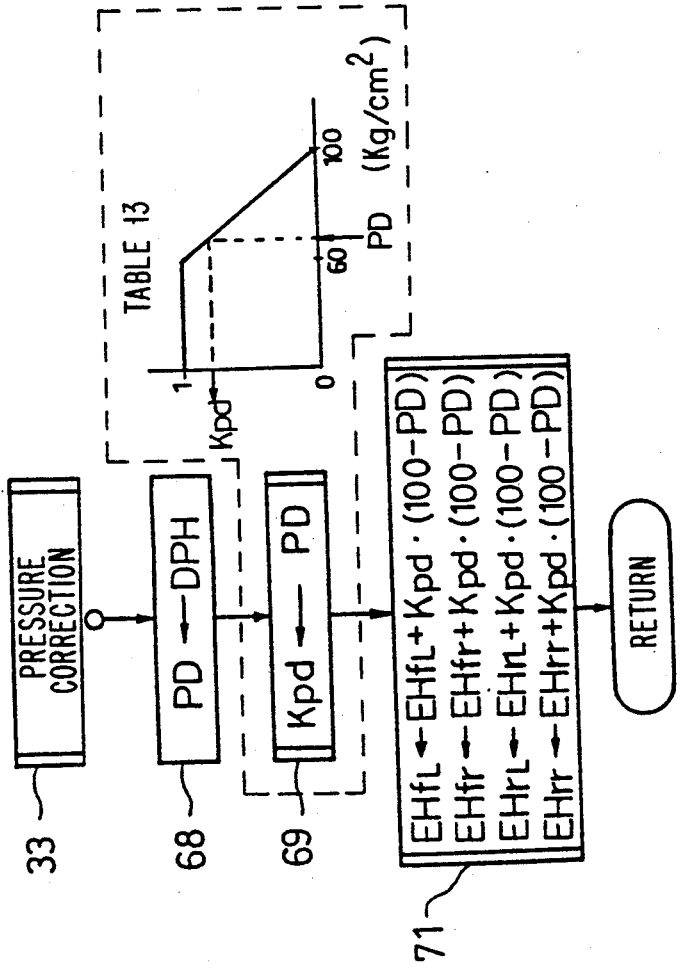

PRESSURE CONTROL SYSTEM FOR SUSPENSION

FIELD OF THE INVENTION

The invention relates to a pressure control of vehicular suspension, in particular, to a system which controls a suspension pressure in a manner to suppress a change in the attitude of a car body as caused by a steering operation or acceleration/deceleration thereof.

Japanese Laid-Open Patent Application No. 106,133/1988 discloses a pressure control system in which a turning pattern of a vehicle is determined on the basis of a steering angle and a steering angular velocity, and is utilized to modify a constant of proportionality or gain which is to be applied to a corrected suspension pressure which is determined in proportion to a lateral acceleration prevailing on the vehicle, and a required suspension pressure is calculated in accordance with a gain and a lateral acceleration of the vehicle to allow a pressure control valve to be energized so as to supply the required pressure to the suspension.

Japanese Laid-Open Utility Model Application No. 114,408/1989 discloses a pressure regulation in which a pump driven by an engine generates a high pressure, from which a system pressure is derived to deliver pressures to be supplied to individual shock absorbers.

The pressure control valve comprises a high pressure port communicating with a high pressure piping, a low pressure port communicating with a fluid return path leading to a reservoir, an output port supplying a pressure to the suspension, a spool which is adapted to be driven in a direction to reduce the degree of communication between the high pressure port and the output port and for increasing the degree of communication between the low pressure port and the output port responsive to an output pressure from the output port which is applied to one end thereof, and a solenoid for driving the spool in the opposite direction. Controlling the energization of the solenoid is effective to determine a balanced position of the spool, thereby feeding a corresponding pressure to the suspension.

However, in the pressure control valve as mentioned above, it is necessary that the solenoid generates a force opposing the "suspension" pressure from the output port which is applied to one end of the spool and acting to maintain the spool in a balanced position. In other words, the solenoid must generate a force of a magnitude which corresponds to the magnitude of the output pressure, and thus is required to generate a force of a relatively large magnitude. This necessarily results in a bulky solenoid construction having an increased power dissipation. On the other hand, since the energizing current level of the solenoid determines the force which should oppose the required output pressure, a linearity is substantially required between the current level and the force applied to the spool. However, it is recognized that the achievement of such a linear relationship to a high accuracy at a higher current level involves extreme difficulties.

The problem can be alleviated by providing a target pressure space between the spool and the solenoid which is connected to the high pressure piping through an orifice, with a valve element controlling the degree of communication of the target pressure space with the low pressure while a solenoid is used to drive the valve element in a direction to increase or decrease the degree of communication. With this arrangement, a pressure corresponding to a position of the valve element is created within the target pressure space, and the spool is driven so as to bring a balance between the pressure in the target pressure space and the pressure from the output port. A force which is required to drive or maintain the valve element at a required position, or the force to be applied to the valve element from the solenoid is minimized, and hence the size as well as the current drain of the solenoid can be reduced while simultaneously facilitating a more fine control of the current level.

However, when a high pressure from the high pressure piping is applied to the target pressure space through the orifice, and a pressure from the target pressure space is established at a target pressure by utilizing the valve element to regulate the degree of communication between the fluid return path or return piping and the reservoir so that the pressure from the high pressure piping may be lowered before it is applied to the suspension, it follows that any variation in the pressure which is supplied from the high pressure piping causes a similar variation in the pressure which prevails in the target pressure space and hence in the pressure from the output port, resulting in a deviation in the pressure applied to the suspension from a required value.

It will be understood that during a racing of an accelerator pedal on a vehicular engine, the driving speed of a fluid pump which is driven by the engine goes up and down, and consequently the pressure of the high pressure piping which is fed with the discharge pressure from the pump also goes up and down, while the discharge pressure of the pump decreases when the engine ceases to operate. During mounting or dismounting of an occupant or the loading or unloading of a load takes place relatively frequently, or when a steering operation in the lateral direction is repeated as a result of a slalom driving, the regulation of a suspension pressure in an attempt to maintain the attitude of a vehicle constant causes the pressure control valve to rise and fall in pressure repeatedly, whereby the discharge of the suspension pressure to the return piping during the pressure fall and the supply of high pressure to the suspension (pressure rise) results in a pressure fall in the high pressure piping. A resulting pressure variation which the high pressure piping undergoes causes an output pressure from the pressure control valve to deviate from a target pressure, thus causing a variation in the suspension pressure and hence a change in the attitude of the car body or a deviation from a target attitude.

When a vehicle is running on an uneven road, the consumption flow rate of the fluid which passes through the pressure control valve from the high pressure to the low pressure piping (the reservoir) increases, causing a shortage of the flow rate supplied to the high pressure piping from the pump, which in turn causes a system pressure of the high pressure piping to be reduced below its normal value. If a control current applied to the pressure control valve is increased in order to compensate for such reduction in the pressure, the pressure control valve will be closed by the valve element between the target pressure space and the low pressure piping, whereby the spool will shift toward the line pressure port, resulting in a continued communication between the line pressure port and the output port. In such instance, the pressure applied to the shock absorber is dependent on the line pressure and hence is susceptible to change, causing a vertical oscillation of the car body to degrade a comfortability of an occupant or passenger.

Such phenomenon can be reduced by increasing the capacity of a pressure source and/or accumulator which supplies a high pressure fluid to the high pressure piping, but this in turn increases the fuel consumption of a prime mover which drives the source. Thus it will be seen that a low power is desired for the pressure source, but the lower the power, the greater the susceptibility the high pressure piping is subject to a pressure variation.

SUMMARY OF THE INVENTION

It is a first object of the invention to reduce a variation in a suspension pressure which is caused by a variation in a pressure from a high pressure piping.

It is a second object of the invention to suppress a degradation in the comfortability of an occupant when a vehicle is running on an uneven road.

It is a third object of the invention to prevent the occurrence of a rapid change in the attitude of a car body as a result of a fault of detecting the pressure in the high pressure piping.

The first and the second object mentioned above can be accomplished in accordance with the invention by providing a pressure control system comprising, a pressure source (1) for drawing fluid from a reservoir (2) and delivering it at a high pressure to a high pressure piping (8) which feeds a hydraulic fluid to a suspension (100$fr$) which is adapted to extend and shrink in response to a pressure supplied thereto; a pressure control valve (80$fr$) including a line pressure port (82) communicating with the high pressure piping (8), a low pressure port (85) communicating with a low pressure path (11), an output port (84) delivering a pressure to the suspension (100$fr$), a target pressure space (88) communicating with the high pressure piping (8) through an orifice (88$f$), a spool responsive to a pressure from the output port (84) applied to its one end to be driven in a direction to reduce the degree of communication between the line pressure port (82) and the output port (84) and to increase a degree of communication between the low pressure port (85) and the output port (84) and also responsive to a pressure from the target pressure space (88) applied to its other end to be driven in a direction to increase a degree of communication between the line pressure port (82) and the output port (84) and to reduce a degree of communication between the low pressure port (85) and the output port (84), a valve element (95) for defining a degree of communication of the target pressure space (88) with the low pressure, and electrical drive means (99) for driving the valve element (95) in a direction to increase/decrease the degree of communication; pressure detecting means (13$rm$) for detecting the pressure within the high pressure piping (8); command means (17) for commanding a pressure value (EHfr shown at step 67) to be applied to the suspension (100$fr$); correction means (17) for correcting the pressure value commanded by the command means (18) in accordance with a pressure (PD) detected by the pressure detecting means (13$rm$) to raise it whenever such pressure remains low; and electrical energization means (32, 33) for electrically energizing the pressure control valve (80$fr$) to apply a pressure to the suspension (100$fr$) which corresponds to a pressure value (EHfr+Kpd·(100−PD)) (shown at step 71) which is corrected by the correction means (17).

It is to be understood that the reference characters indicated in parentheses indicate reference characters or numerals appearing in the drawings to be described later in a first embodiment to be described below.

With this arrangement, the electrical energization means (32, 33) electrically energizes the pressure control valve (80$fr$) so that the pressure value (EFfr) commanded by the command means (18) be applied to the suspension (100$fr$), and thus a pressure corresponding to the command (EHfr) from the command means (18) can be established in the suspension (100$fr$). When the pressure in the high pressure piping (6) decreases, the correction means (17) acts to raise the pressure value (EHfr) from the command means (17) in a manner corresponding to the pressure (PD) detected by the pressure detecting means (13$rm$) so that a command value (EHfr+Kpd·(100−PD)) which is delivered by the electrical energization means (32, 33) will be higher than the pressure value (EHfr) from the command means (17), whereby a pressure which has compensated for or cancelled a reduction in the output pressure from the pressure control valve (80$fr$) due to a pressure fall in the high pressure piping (6) or which is substantially equal to the pressure value or target pressure (EHfr) commanded by the command means (17) is applied to the suspension (100$fr$). In this manner, a pressure fall in the suspension which might result from a pressure reduction in the high pressure piping (6) is reduced. In other words, a variation in the suspension pressure which is caused by a variation in the pressure of the high pressure piping (6) is decreased.

In order to accomplish the first and the second object mentioned above, the pressure control system of the invention additionally includes vehicle speed detecting means. The correction means (17) is additionally effective to correct a corrected value, which is once corrected so as to correspond to the pressure (PD) detected by the pressure detecting means (13$rm$), in accordance with the vehicle speed detected by the vehicle speed detecting means. In a second preferred embodiment of the invention, a ratio of such correction to a reduction in the detected pressure (PD) or a correction gain is chosen to be high when the vehicle speed is equal to zero or at low values, while it is chosen to be equal to zero or low value when the vehicle speed is relatively high.

In order to prevent the occurrence of a continued communication between the line pressure port and the output port of the regulator valve means when a vehicle is running on an uneven road, the correction gain for a reduction in the system pressure must be chosen to be small. However, the choice of a small value for the correction gain results in a failure to suppress a change in a vehicle elevation during an idling condition. However, it will be appreciated that an idling condition prevails when the vehicle remains at rest or has very low speeds, and cannot take place with any degree of possibility under a normal running condition, for example, when the vehicle speed is equal to or greater than 10 km/h. Accordingly, during a normal running, the correction for the system pressure can be dispensed with without any likelihood that this might cause a change in the vehicle elevation. In this manner, even when the vehicle is running on an uneven road, the invention effectively prevents the occurrence of continued communication between the line pressure port and the output of the pressure control valve, thus avoiding a degradation in the comfortability of an occupant or passenger.

The first and the third object mentioned above can be accomplished in accordance with the invention by providing a pressure control system of the character mentioned above which additionally includes means (17) for detecting a fault of the pressure detecting means (13rm) which is used to detect pressure information (PD). In the event a fault is determined to have occurred, the correction means (17) changes a corrected value corresponding to the detected pressure (PD) to zero substantially.

It will be appreciated that when any abnormality occurs with the pressure detecting means (13rm), a resulting corrected value will also assume an abnormal value, eventually resulting in a suspension pressure which represents a large variation from a target pressure. However, in accordance with the invention, when detected pressure information (PD) is determined to be faulty, the corrected value is changed to zero substantially. In other words, a correction for the pressure which responds to a pressure variation in the high pressure line is substantially invalidated. In this manner, a failure of the pressure detecting means (13rm) is prevented from causing abnormally low or high suspension pressure.

Other objects and features of the invention will become apparent from the following description of several embodiments thereof with reference to the drawings.

BRIEF DESCRIPTION OF THE DRAWINGS

FIG. 2 is a longitudinal section, to an enlarged scale, of a suspension 100fr shown in FIG. 1a;

FIG. 3 is a longitudinal section, to an enlarged scale, of a pressure control valve 80fr shown in FIG. 1a;

FIG. 4 is a longitudinal section, to an enlarged scale, of a cut valve 70fr shown in FIG. 1a;

FIG. 5 is a longitudinal section, to an enlarged scale, of a relief valve 60fr shown in FIG. 1a;

FIG. 6 is a longitudinal section, to an enlarged scale, of a main check valve 50 shown in FIG. 1a;

FIGS. 9a, 9b and 9c are flow charts illustrating a control operation by a microprocessor 17 shown in FIG. 8a;

FIGS. 10a, 10b, 10c, 10d, 10e, 10f and 10g are flow charts showing subroutines shown in FIG. 9c in detail;

FIGS. 11a and 11b graphically show data content which is written into an internal ROM of CPU 17 shown in FIG. 8a;

DESCRIPTION OF PREFERRED EMBODIMENTS FIRST EMBODIMENT

Figure 1A:
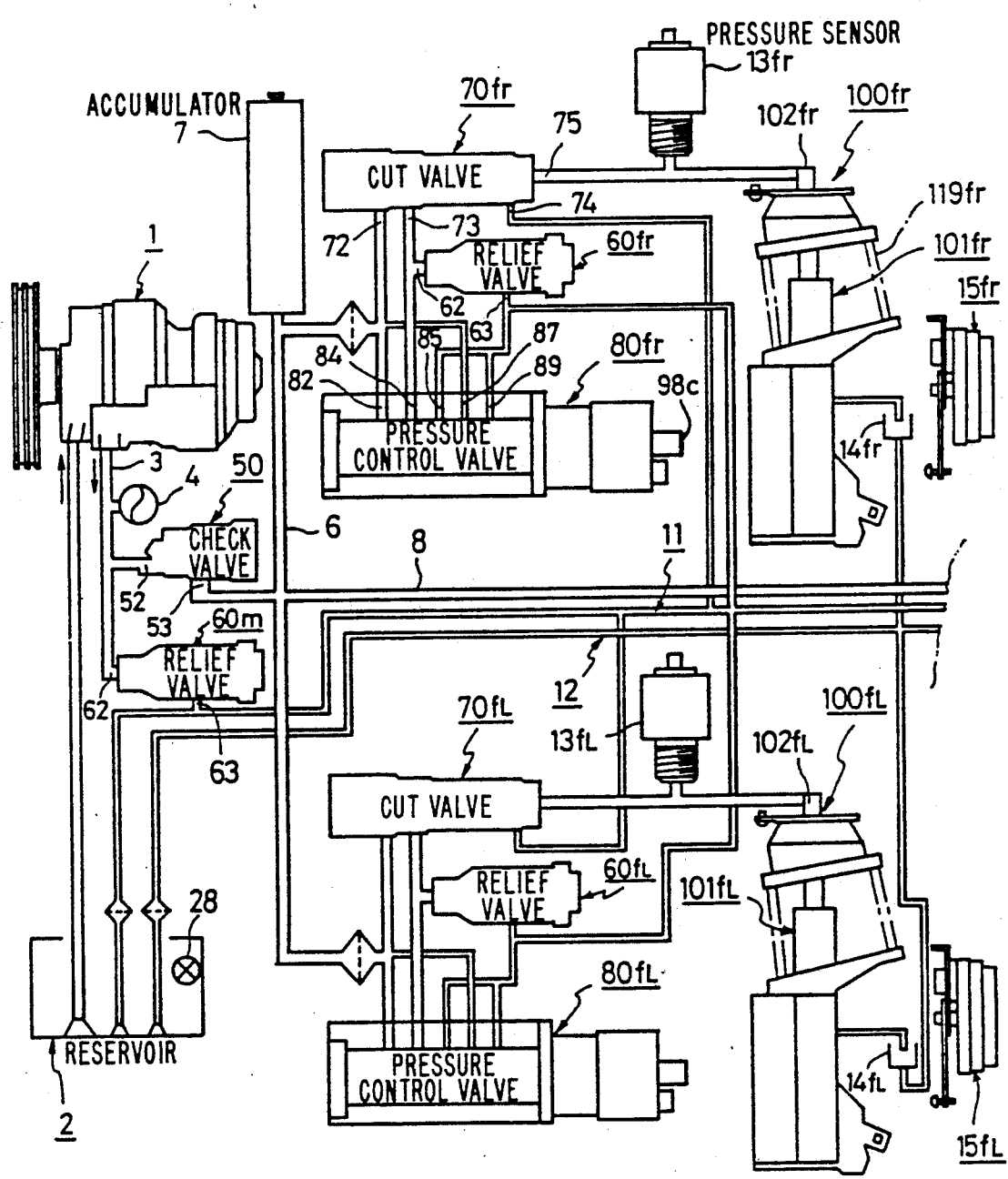
FIGS. 1a and 1b are block diagrams of a suspension pressure feeding system according to a first embodiment of the invention, each Figure representing one of halves of a single system.
Figure 1B:
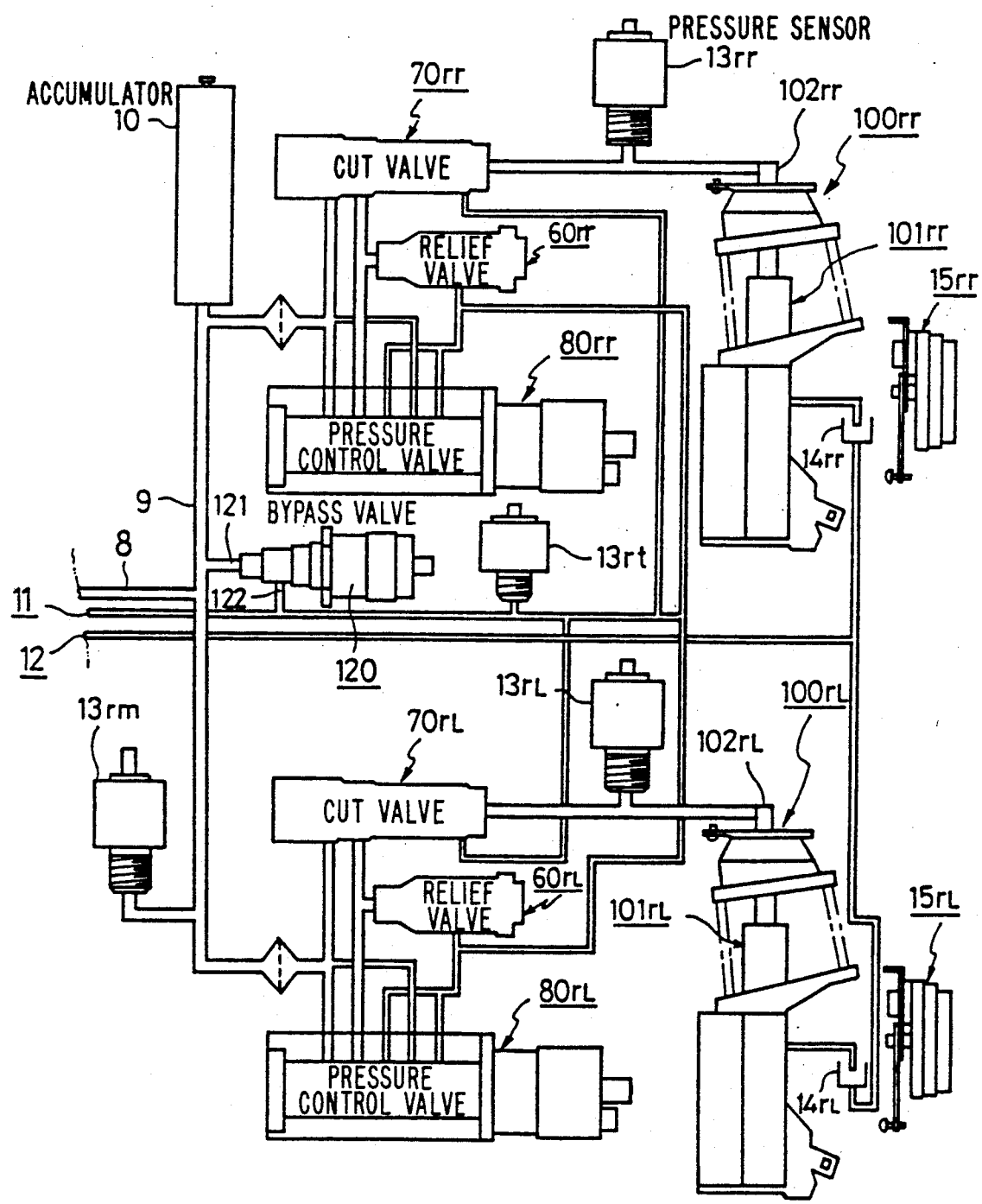

FIGS. 1a and 1b show a mechanical arrangement of an apparatus which supports a carrosserie or car body. An oil pressure pump 1, which is of radial type, is disposed within an engine room, and is driven for rotation by an onboard engine, not shown, thus drawing an oil from a reservoir 2 and discharging a given flow rate of oil to a high pressure port 3 at a rotational speed equal to or greater than a given value.

High pressure port 3 of the radial pump is connected to an accumulator 4 which serves suppressing pulsations, to a main check valve 50 and to a relief valve 60m. A high pressure oil from the port 3 is fed to a high pressure piping 8 through the valve 50. The check valve 50 blocks a reverse flow of the oil from the piping 8 to the port 3 whenever the port 3 assumes a lower pressure than the piping 8. The relief valve 60m drains the port 3 to a reservoir return piping 11, which represents one of return oil paths to the reservoir 2, when the pressure of the port 3 assumes a greater than a given value, thus maintaining the pressure of the port 3 substantially at a given pressure.

The high pressure feed piping 8 communicates with a front wheel high pressure feed piping 6 which feeds a high pressure to front wheel suspensions 100fL, 100fr, and a rear wheel high pressure feed piping 9 which feeds high pressure to rear wheel suspensions 100rL, 100rr. The piping 6 communicates with an accumulator 7 for the front wheels while the piping 9 communicates with an accumulator 10 for the rear wheels.

The piping 6 is also connected to a pressure control valve 80fr through an oil filter, and the valve 80fr is effective to regulate or reduce the pressure from the piping 6, which will be hereafter referred to as a front wheel line pressure, to a required pressure before supplying it to a cut valve 70fr and a relief valve 60fr. The required pressure is substantially proportional to a current level which is used to energize an electrical coil of the valve 80fr and represents a suspension sustain pressure.

When the pressure of the piping 6 or the front wheel line pressure is below a given value, the cut valve 70fr interrupts a communication between the output port 84 (to the suspension) of the pressure control valve 80fr and a hollow piston rod 102fr associated with a shock absorber 101fr of the suspension 100fr, thus preventing the pressure of the piston rod 102fr from being released to the pressure control valve 80fr. When the front rear line pressure remains at or above the given value, the cut valve 70fr allows the output pressure from the pressure control valve 80fr to be directly fed to the piston rod 102fr.

The relief valve 60fr restricts the internal pressure of the shock absorber 101fr at or below an upper limit. Specifically, when the suspension sustain pressure from the output port 84 of the pressure control valve 80fr exceeds a given high pressure, the output port 84 is drained to the reservoir return path or piping 11, thus maintaining the output port of the valve 80fr substantially at or below the given high pressure. The relief valve 60fr is also effective to provide a buffering action upon the transmission to the pressure control valve 80fr of any shocking rise in the internal pressure of the shock absorber 101fr, as when a front, right wheel of the vehicle strikes against a bump on the road. In response to such rise, the internal pressure of the shock absorber 101fr is drained to the reservoir return path 11 through the piston rod 100fr and the cut valve.

The suspension 100fr essentially comprises the shock absorber 101fr and a coiled suspension spring 119fr, and operates to maintain a car body at an elevation relative to the front, right wheel, which corresponds to the pressure supplied to the shock absorber 101fr from the output port 84 of the pressure control valve 80fr through the piston rod 102fr, or a pressure which is regulated by the pressure control valve 80fr or the suspension sustain pressure.

The sustain pressure fed to the shock absorber 101fr is detected by a pressure sensor 13fr, which produces an analog signal representing a detected sustain pressure. A vehicle elevation sensor 15fr is mounted on the car body adjacent to the suspension 100fr, and includes a rotor connected to a link which is coupled to the front, right wheel. In this manner, the sensor 15fr produces a digital data representing the elevation of a car body with respect to the front, right wheel.

In a similar manner, a suspension 100fL associated with a front, left wheel is equipped with a pressure control valve 80fL, a cut valve 70fL, a relief valve 60fL, a vehicle elevation sensor 50fL, and a pressure sensor 13fL. The pressure control valve 80fL is connected to the front wheel high pressure feed piping 6, thus feeding a required pressure to the piston rod 102fL of the shock absorber 101fL of the suspension 100fL.

Furthermore, a suspension 100rr associated with a rear, right wheel is equipped with a pressure control valve 80rr, a cut valve 70rr, a relief valve 60rr, a vehicle elevation sensor 15rr and a pressure sensor 13rr. The valve 80rr is connected to the rear wheel high pressure feed piping 9, feeding a required pressure to the piston rod 102rr of a shock absorber 101rr of the suspension 100rr.

Finally, a suspension 100rL associated with a rear, left wheel is equipped with a pressure control valve 80rL, a cut valve 70rL, a relief valve 60rL, a vehicle elevation sensor 15rL and a pressure sensor 13rL. The pressure control valve 80rL is connected to the rear wheel high pressure feed piping 9, feeding a required pressure to the piston rod 102rL of a shock absorber 101rL of the suspension 100rL.

In this embodiment, an engine is mounted on the front wheel side, and accordingly the pump 1 is also mounted on the front wheel side or in the engine room, whereby the length of pipings from the pump 1 to the rear wheel suspensions 100rr, 100rL is greater than the length of pipings from the pump 1 to the front wheel suspensions 100fr, 100fL. Accordingly, a pressure drop caused by the piping path is greater for the rear wheels, and if an oil leakage occurs in the piping, the pressure drop will be greatest for the rear wheels. Accordingly, a line pressure detecting sensor 13rm is connected to the rear wheel high pressure feed piping 9. On the other hand, the pressure of the reservoir return path 11 will be lowest at its end located nearer the reservoir 2, and will tend to increase in a direction away from the reservoir 2. Accordingly, the pressure of the reservoir return path 11 is also detected by a pressure sensor 13rr which is located toward the rear wheel.

The piping 9 is connected to a bypass valve 120, which is effective to regulate a pressure in the high pressure feed piping 8 to a value which corresponds to a current level used to energize an electrical coil of the valve 120, thus obtaining a required line pressure. When an ignition switch is opened to stop the operation of the engine and hence the pump 1, the line pressure is reduced substantially to zero or drained through the reservoir return path 11 to the atmospheric pressure which prevails in the reservoir 2, thus reducing the loading upon the engine or pump when restarting. The reduction in the line pressure turns the cut valves 70fr, 70fL, 70rr, 70rL off, thus preventing a pressure release from the shock absorbers.

Figure 2:
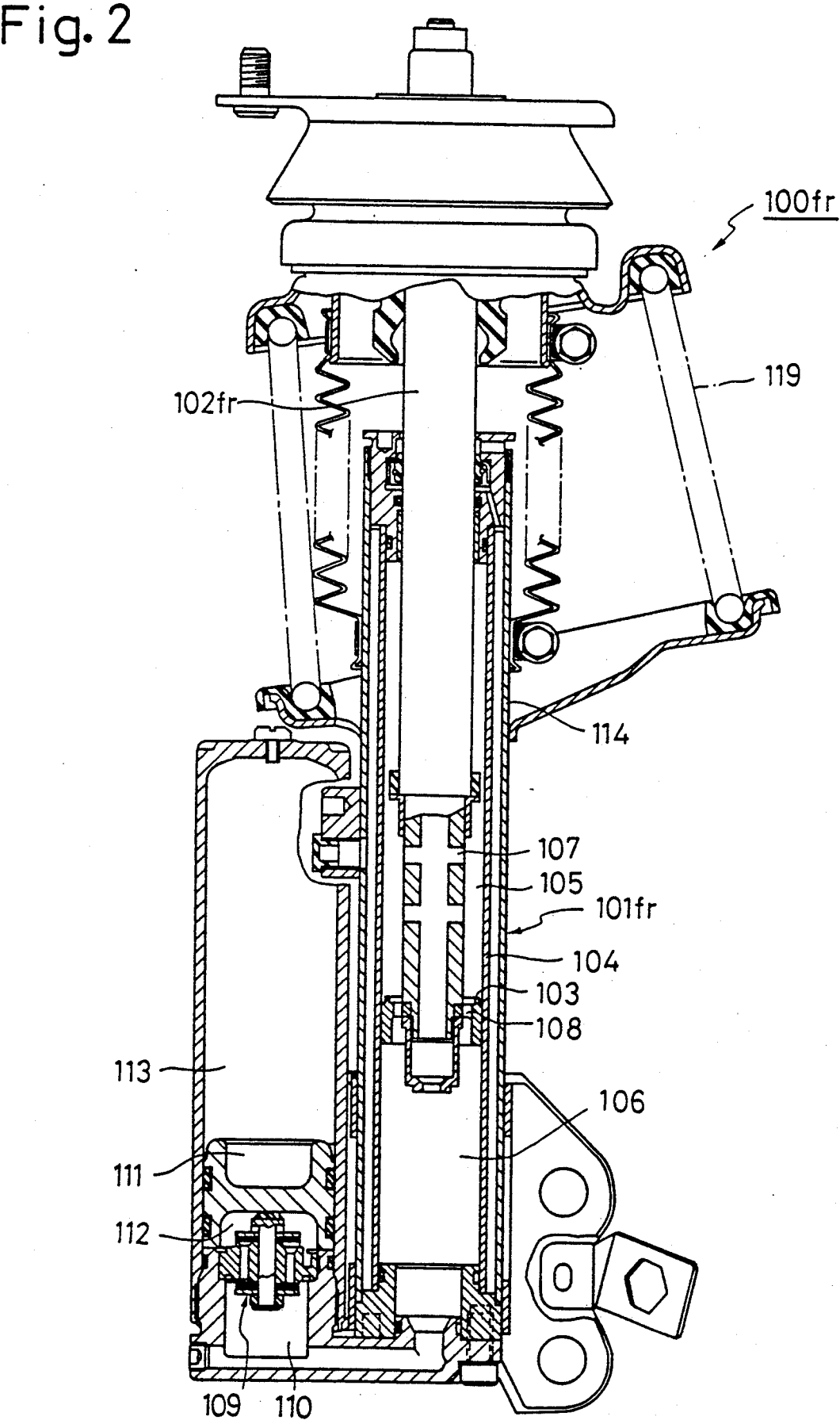

FIG. 2 shows a longitudinal section, to an enlarged scale, of the suspension 100fr. A piston 103 is fixedly mounted on the piston rod 102fr of the shock absorber 101fr, and extends through an inner sleeve 104 to divide its interior into an upper chamber 105 and a lower chamber 106. An oil pump pressure which represents the suspension sustain pressure is fed to the piston rod 102fr from the output port of the cut valve 70fr, which pressure is passed through a side opening 107 in the piston rod 102fr to be applied to the upper chamber 105 disposed inside the inner sleeve 104, and thence passed through a vertical through-opening 108 formed in the piston rod 103 to be applied to lower chamber 106. A sustain pressure which is proportional to the product of the pressure applied to the lower chamber 106 and cross-sectional area (the square of the rod radius multiplied by $\pi$) of the piston rod 102fr is applied to the piston rod 102fr.

The lower chamber 106 communicates with a lower space 110 in an attenuator valve unit 109, which has an upper space that is divided by a piston 111 into a lower chamber 112 and an upper chamber 113. An oil from the lower space 110 passes through the valve unit 109 into the lower chamber 112 while a high pressure gas is confined in the upper chamber 113.

If the piston rod 102fr plunges rapidly downward into the inner sleeve 104 as a result of a bumping reaction of the front, right wheel, the internal pressure of the inner sleeve 104 increases rapidly, and similarly, the pressure in the lower space 110 tends to increase above the pressure in the lower pressure 112 rapidly. At this time, oil flows from the lower space 110 into the lower chamber 112 through a check valve which permits a flow of the oil from the lower space 110 to the lower chamber 112 above a given pressure differential across the valve unit 109, but which blocks a passage of the oil in the opposite direction, whereby the piston 111 moves up, thus buffering the transmission of upward impact applied from the wheel to the piston rod 102fr. In this manner, the transmission of bumping effect of the wheel to the car body is buffered.

If the piston rod 102fr tends to be withdrawn upwardly from within the inner sleeve 104 as the front, right wheel goes down rapidly, the internal pressure of the inner sleeve 104 reduces rapidly, again causing the pressure of the lower space 110 to be rapidly reduced below the pressure of the lower chamber 112. At this time, oil flows from the lower chamber 112 to the lower space 110 through a check valve which permits a flow of the oil from the lower chamber 112 to the lower space 110 above a given pressure differential across the valve unit 109, but which blocks a passage of the oil in the opposite direction, whereby the piston 111 moves down, buffering the transmission of downward impact applied from the wheel to the piston rod 102fr. In this manner, the transmission of impact applied to the wheel or falling effect to the car body is buffered.

As the pressure applied to the shock absorber 101fr increases in order to increase the vehicle elevation, the pressure in the lower chamber 112 rises, which in turn causes the piston 111 to be raised, allowing the latter to assume a position which corresponds to a loading upon the car body.

When there is no vertical movement of the piston rod 102fr relative to the inner sleeve 104 as during a parking condition, a seal between the inner sleeve 104 and the piston rod 102fr prevents any substantial oil leakage from the inner sleeve 104 to an outer sleeve 114. However, it is desirable that such seal exhibits a sealing characteristic which permits a very limited amount of oil leakage during the vertical movement of the piston rod 102fr in order to reduce a resistance presented to such movement of the rod 102fr. Any oil leaking to the outer sleeve 114 is returned to the reservoir 2 through a drain 14fr (FIG. 1a) which is open to the atmosphere and a drain return piping 12 (FIG. 1a), which represents a second return path. The reservoir 2 is equipped with a level sensor 28 (FIG. 1a), which produces an oil shortage signal when the oil level within the reservoir 2 is below a lower limit.

It should be understood that other suspensions 100fL, 100rr and 100rL are constructed in substantially the same manner as the suspension 100fr mentioned above.

Figure 3:
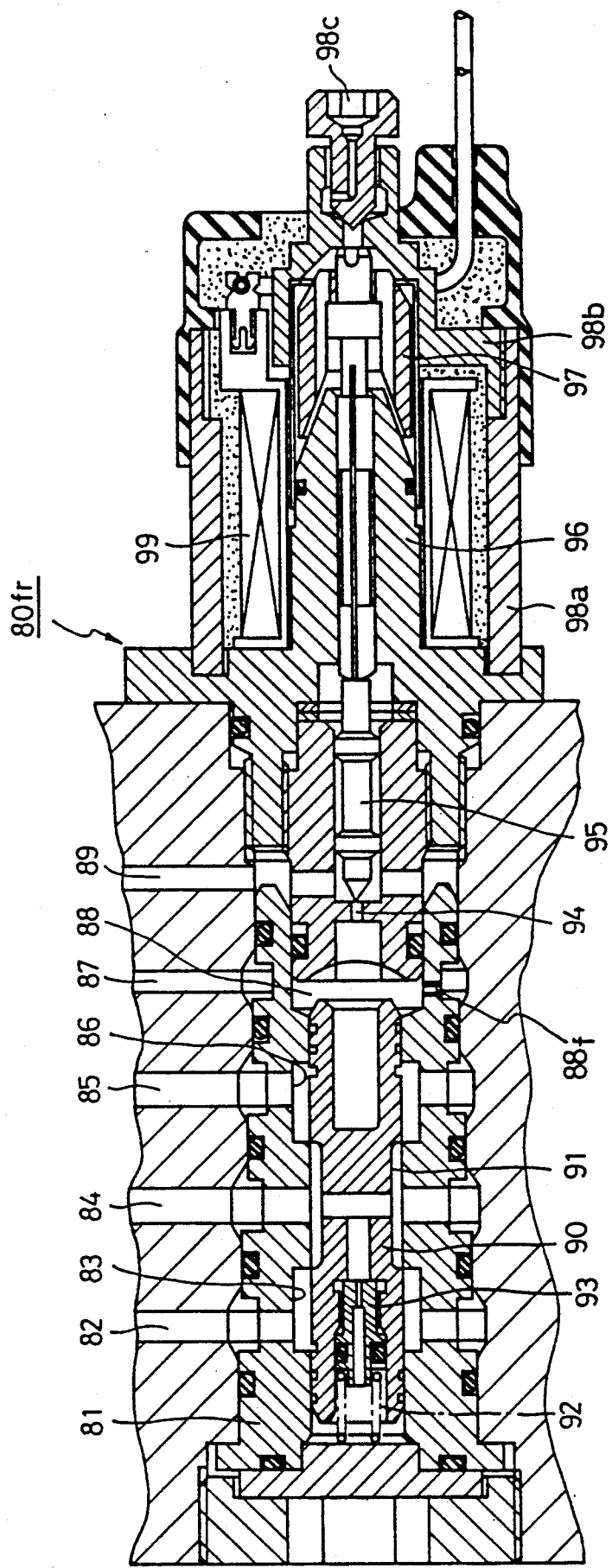

FIG. 3 shows a longitudinal section, to an enlarged scale, of the pressure control valve 80fr. It includes a sleeve 81, which is centrally formed with a spool receiving opening, the inner surface of which is formed with an annular groove 83 communicating with a line pressure port 82 and another annular groove 86 communicating with a low pressure port 85. An output port 84 opens into the sleeve at a location intermediate the both annular grooves 83, 86. A spool 90 is inserted into the spool receiving opening, and intermediate its length, its peripheral surface is formed with an annular groove 91 having a width which corresponds to the distance between a right edge of the groove 83 and a left edge of the groove 86. The left end of the spool 90 is formed with a valve receiving opening, which communicates with the groove 91, and into which a valve element 93 is inserted and held in place by a coiled compression spring 92. The valve element 93 is centrally formed with an orifice extending therethrough, which provides a communication between the space in which the groove 91 and hence the output port 84 is located and the space in which the valve element 93 and the spring 92 are received. Accordingly, at its left end, the spool 90 is subject to a pressure from the output port 84 or a regulated pressure which is applied to the suspension 100fr, whereby it is urged to the right. In the event a pressure from the output port 84 increases in an impulse manner, the valve element 93 is driven to the left against the resilience of the spring 92, creating a buffering space to the right of the valve element 93. Accordingly, when the pressure from the output port 94 rises in an impulse manner, such pressure rise is not immediately applied to the left end face of the spool 90, and thus the valve element 93 provides a buffering action upon a movement of the spool 90 to the right in response to an impulse-like pressure rise, or pressure surge from the output port 84. Conversely, it also exerts a buffering action upon a movement of the spool 90 to the left in response to an impulse-like pressure fall from the output port 84.

The right end face of the spool 90 is subject to a pressure from a target pressure space 88 communicating with a high pressure port 87, which pressure is supplied through an orifice 88f, whereby the spool 90 is urged to the left. A line pressure is fed to the high pressure port 87 while the target pressure space 88 communicates with a low pressure port 89 through a channel 94, the channel opening of which is determined by a needle valve 95. When the needle valve 95 closes the channel 94, the target pressure space 88 which communicates with the high pressure port 87 through the orifice 88f assumes the line pressure of the port 87, whereby the spool 90 is driven to the left, allowing the groove 91 in the spool 90 to communicate with the groove 83 or the line pressure port 82, thus causing the pressure of the port 91 or output port 84 to rise which is then transmitted to the left of the valve element 93, thus imparting a rightward driving force to the left end of the spool 90. When the needle valve 95 is located to leave the channel 94 fully open, the pressure from the space 88 will be substantially reduced below the line pressure from the high pressure port 87 because of the restriction presented by the orifice 88f. Accordingly the spool 90 moves to the right, allowing the groove 91 in the spool 90 to communicate with the groove 86 or the low pressure port 85, reducing the pressure in the port 91 or the output port 84. Such pressure is transmitted to the left of the valve element 93, thus reducing the rightward driving force which is applied to the left end of the spool 90. In this manner, the spool 90 assumes a position where the pressure from the target pressure space 80 is balanced with the pressure from the output port 84. Stated differently, a pressure which is substantially proportional to the pressure from the target pressure space 88 appears at the output port 84.

The pressure in the target pressure space 88 is determined by the position of the needle valve 95, which is in turn substantially in inverse proportion to the distance of the needle valve 95 from the channel 94, and hence there appears at the output port 84 a pressure which is substantially inversely proportional to the distance of the needle valve 95.

A stationary core 96 of magnetizable material is shaped to allow the needle valve 95 to extend therethrough, and has a right end which is in the form of truncated cone, which is opposed by a conical end face of a plunger 97, also formed of a magnetizable material, which defines an opening having a closed bottom. The needle valve 95 is secured to the plunger 97. The core 96 and the plunger 97 extend into a bobbin which carries an electrical coil 99 thereon.

When the coil 99 is energized, there is established a loop for a magnetic flux comprising the core 96, a yoke of magnetizable material 98a, an end plate of a magnetizable material 98b and the plunger 97 and then back to the core 96. The plunger 97 is attracted toward the core 96 and thus moves to the left, bringing the needle valve 95 closer to the channel 94 or reducing the distance mentioned above. It will be noted that the left end of the needle valve 95 is subject to a pressure from the target pressure space 88 which acts to drive it to the right while the right end of the needle valve 95 is subject to the atmospheric pressure through a low pressure port 98c which is open to the atmosphere, so that the needle valve 95 will be driven to the right by the pressure from the target pressure space 88 with a force which depends on the magnitude of such pressure (it will be noted that this corresponds to the position of the needle valve 95). As a consequence, the needle valve 95 is spaced from the channel 94 by a distance which is virtually inversely proportional to the current level which is used to energize the coil 99. One of the core and the plunger is shaped as a truncated cone while the other is shaped as a complementary conical opening in order to achieve a linear relationship between the current level and distance. As a consequence of such arrangement, there appears an output at the output port 84 which is substantially proportional to the current level used to energize the coil 99. The pressure control valve 80fr delivers a pressure at the output port 84 which is proportional to the current level within a given range.

Figure 4:
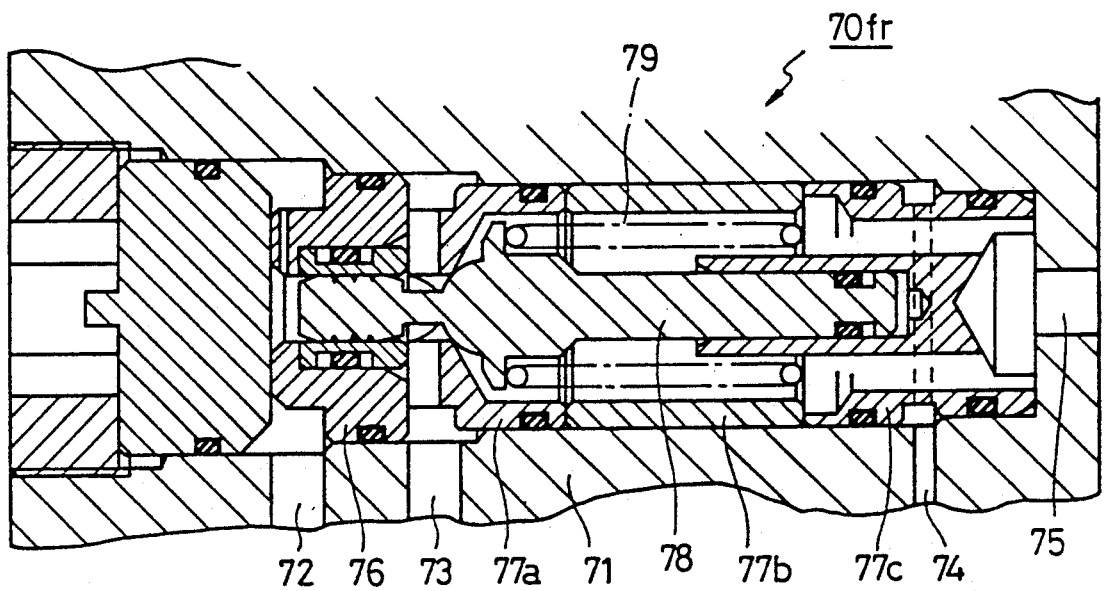

FIG. 4 shows a longitudinal section of the cut valve 70fr to an enlarged scale. It includes a valve body 71 formed with a valve receiving bore which communicates with a line pressure port 72, a regulation input port 73, a drain port 74 and an output port 75. An annular first guide 76 provides a partition between the ports 72 and 73, and three cylindrical guides 77a, 77b and 77c provide a partition between the ports 73 and 75. The drain port 74 communicates with an annular groove formed in the outer periphery of the second guide 77c, thus returning any oil which leaks to the outer periphery of these second guides 77a to 77c to the return path 11.

A line pressure is applied to the left end of a spool 78 which extends through the first and the second guide 76, 77a to 77c and which is urged to the left by a coiled compression spring 79. A guide hole formed in a central plateau of the second guide 77c in which the right end of the spool 78 is disposed communicates with the return path 11 through an annular groove formed in the outer periphery of this guide and through the drain hole 74. When the line pressure is below a given low value, the spool 78 is driven to its leftmost position under the resilience of the spring 79, whereby a communication between the ports 75 and 73 is interrupted as a result of the spool 78 fully closing the internal opening of the second guide 77a. When the line pressure becomes equal to or greater than the given value, such pressure is effective to begin driving the spool 78 to the right against the resilience of the spring 79, and the spool 78 reaches to its rightmost position where it is fully open at a particular pressure above the given low pressure. Thus, the spool 78 moves past the inner opening in the second guide 77a to the right thereof, whereby a communication is established between the ports 73 and 75, and when the line pressure from the port 72 rises to the given low pressure, the cut valve 70fr begins establishing a communication between the port 73 (the regulated pressure output from the pressure control valve 80fr) and the output port 75 (shock absorber 101fr). As the line pressure from the port 72 further increases, a full communication is established between the ports 73 and 75. As the line pressure decreases, the procedure is opposite to that mentioned above, and when the line pressure decreases below the given low pressure, the output port 75 or the shock absorber 101fr is completely cut off from the regulating input port 73 or the regulated output from the pressure control valve 80fr.

Figure 5:
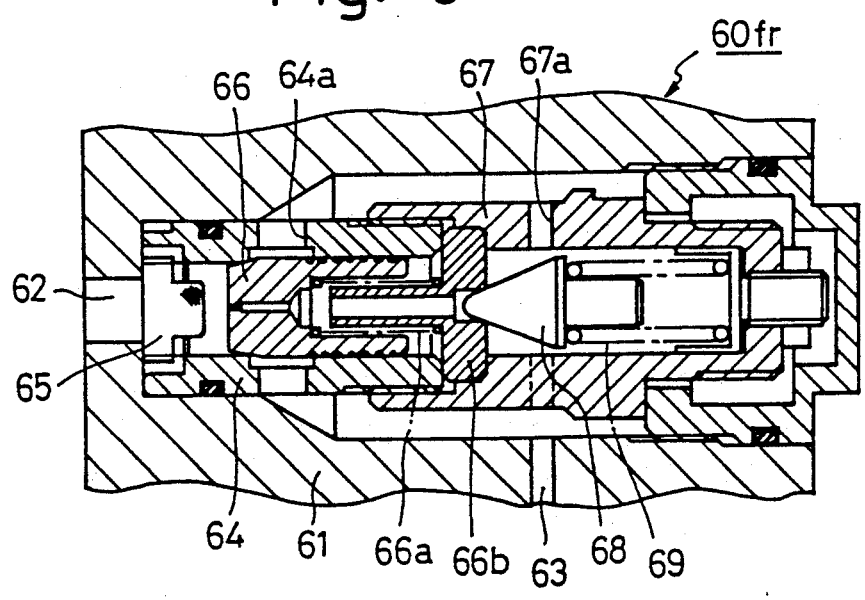

FIG. 5 shows the relief valve 60fr in an enlarged longitudinal section. It includes a valve body 61 formed with a valve receiving bore, into which an input port 62 and a low pressure port 63 open. The valve receiving opening receives a first guide 64 and a second guide 67, both of which are cylindrical in configuration, and the input port 62 communicates with the inner space of the first guide 64 through a filter 65. A valve element 66 having a centrally disposed orifice is inserted into the first guide 64, and the valve element 66 is urged to the left by a coiled compression spring 66a. The space in the first guide 64 in which the valve element 66 and the spring 66a are received communicates with the input port 62 through the orifice in the valve element 66, and also communicates with the internal space of the second guide 67 through an opening formed in a spring abutment 66b. A conical valve element 68 is urged to the left by a coiled compression spring 69 to close the opening in the spring abutment 66b. When a control pressure from the input port 62 is below a given high pressure, a space in which the spring 66a is received and which communicates with the input port 62 through the orifice in the valve element 66 assumes a pressure which is less in magnitude than the resilience of the spring 69, whereby the valve element 68 closes the central opening in the valve seat 66b, as shown in FIG. 5. Thus, the output port 62 is cut off from the internal space of the second guide 67 which communicates with the low pressure port 63 through an opening 67a. Thus, the output port 62 is cut off from the low pressure port 63.

When the control pressure to the input port 62 rises to the given high pressure, the pressure which is applied to the central opening in the valve seat 66b through the orifice in the valve element 66 is effective to initiate driving the valve element 68 to the right, and when the pressure from the port 62 further increases, the valve element 68 will be driven to its rightmost position, where the pressure from the input port 62 will be discharged into the low pressure port 63, thus suppressing the control pressure around or less than the given high pressure.

When a high pressure surge is applied to the input port 62, the valve element 66 is driven to the right, whereby the input port 62 communicates with the space in the body 61 which receives the valve through a lateral opening 64a formed in the first guide 64 and thence to the low pressure port 63 having an increased channel area, thus providing a buffering action upon a rapid pressure surge applied from the input port 62.

Figure 6:
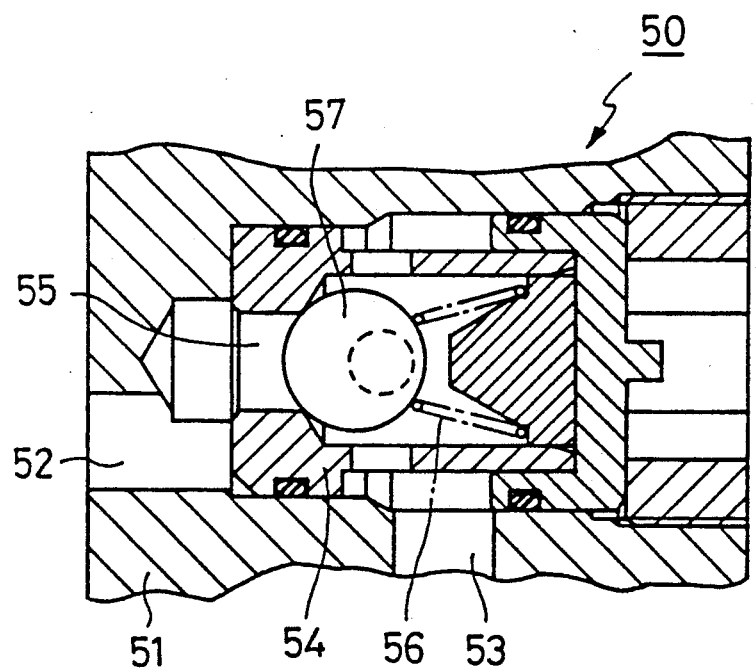

FIG. 6 is an enlarged longitudinal section of the main check valve 50. It includes a valve body 51 formed with a valve receiving bore, which communicates with an input port 52 and an output port 53. A cylindrical valve seat 54 having a closed bottom is received in the bore, and is formed with a channel opening 55, which is usually closed by a ball valve 57 as urged by a coiled compression spring 56. However, when the pressure of the input port 52 is higher than the pressure of the output port 53, the ball valve 57 is pushed back to the right by the pressure from the input port 52, thus opening the channel opening 55 to allow an oil flow in a direction from the input port 52 to the output port 53. However, when the output port 53 assumes a pressure greater than that of the input port 52, the channel opening is closed by the ball valve 57, thus blocking a reverse oil flow.

Figure 7:
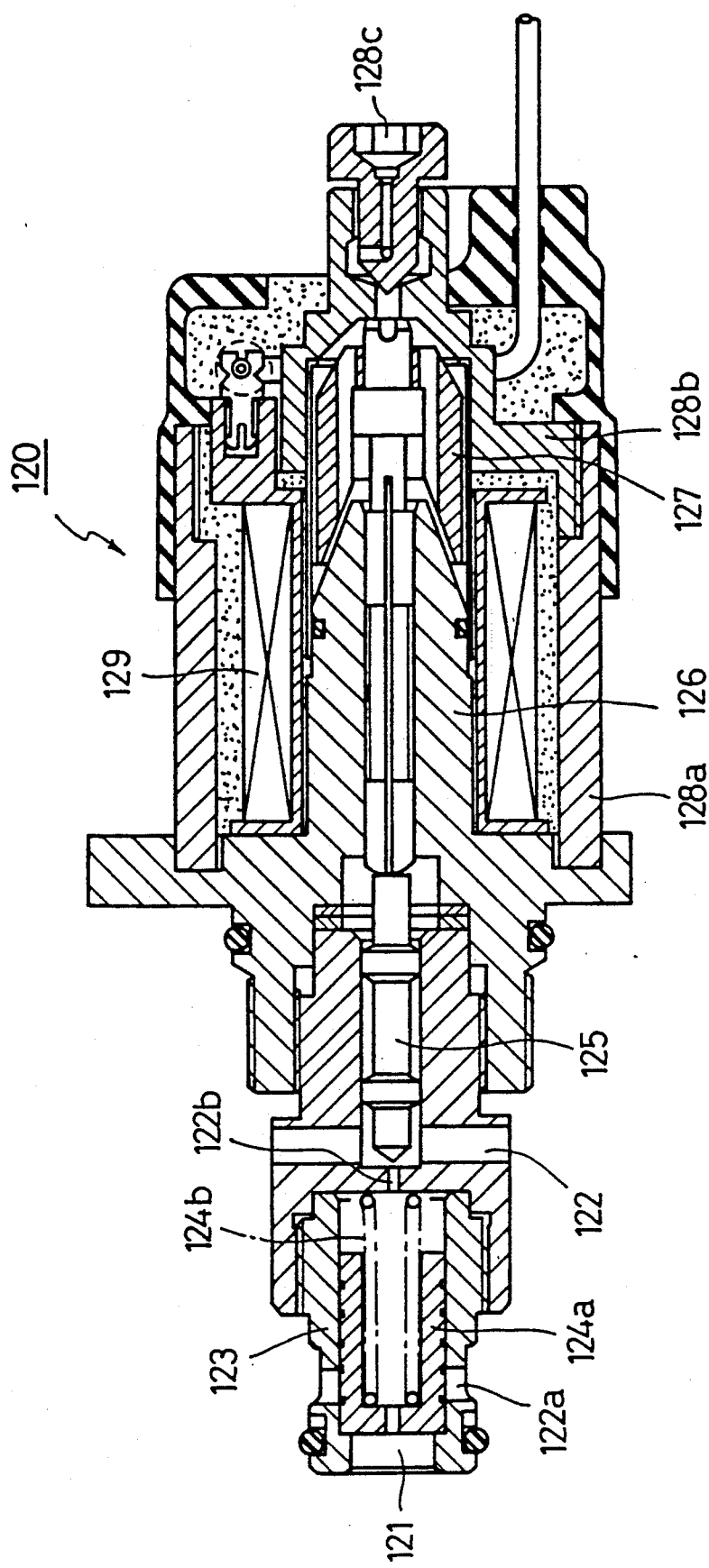
FIG. 7 is a longitudinal section, to an enlarged scale, of a bypass valve 120 shown in FIG. 1b.

FIG. 7 shows a bypass valve 120 in an enlarged longitudinal section. It includes a input port 121 which communicates with the internal space of a first guide 123, in which a valve element 124a is received and is normally urged to the left by a coiled compression spring 124b. The valve element 124a is centrally formed with an orifice in its left end face, through which the input port 121 communicates with the internal space of the first guide 123. This space communicates with a low pressure port 122 through a channel 122b, which is open or closed by a needle valve 125.

Solenoid assembly comprising components including the needle valve 125 and an electrical coil 129 has the same construction and the same size as the solenoid assembly shown in FIG. 3 including the needle valve 95 and the electrical coil 99 so as to be used in common for the pressure control valve and the bypass valve. It is designed so that the spacing of the needle valve 125 from the orifice 122b is substantially in inverse proportion to the current level which passes through the coil 129. The channel opening which the orifice 122b exhibits is in inverse proportion to the spacing, and hence the flow rate of the oil which passes from the input port 121 through the orifice of the valve element 124a, the internal space of the first guide 123 and through the orifice 122b to the low pressure port 112 is proportional to the pressure differential across the orifice formed in the left end face of the valve element 124a.

As a consequence, the pressure of the input port 121 will be substantially proportional to the current level which passes through the coil 129. The bypass valve 120 operates to provide a line pressure at the input port 121 which is proportional to the current level in a given range. When an ignition switch is off and accordingly the engine as well as the pump 1 cease to operate, the coil 129 is deenergized, whereby the needle valve 125 moves to its rightmost position, and the input port 121 or its line pressure assumes a low value which is near the return pressure.

When a high pressure surge is applied to the input port 121, the valve element 124a is driven to the right, whereby the low pressure port 122a communicating with the low pressure port 122 communicates with the input port 121. Since the low pressure port 122a has a relatively large opening, the pressure surge applied to the input port 121 is immediately discharged through the low pressure port 122a.

The relief valve 60m is constructed in the same manner as the relief valve 60fr mentioned above, but employs a coiled compression spring (69) having slightly less resilience for urging a conical valve element (68 shown in FIG. 5). Accordingly, an output port (62) is cut off from a low pressure port (63) when a pressure from an input port (62) or a pressure at the high pressure port 3 is below a at which the relief valve 60fr discharges the pressure at its input port 62 to the low pressure port 63. When the input port (62) assumes a pressure which is equal to or greater than the given high pressure, a valve element (68) is driven to its rightmost position. In this manner, the pressure from the input port (62) is discharged to the low pressure port (63), thus suppressing the pressure at the high pressure port 3 at or below the given high pressure.

In the apparatus for supporting a carrosserie as shown in FIGS. 1a and 1b, the main check valve 50 supplies oil from the high pressure port 3 to the high pressure piping 8, but blocks a reverse flow from the piping 8 to the port 3. The relief valve 60m suppresses the pressure at the high pressure port 3 or the high pressure piping 8 at or below a given high pressure, and in the event a high pressure surge is applied to the port 3, it releases such surge to the return path 11, thus buffering the transmission of a pressure surge to the piping 8.

The bypass valve 120 controls the pressure of the rear wheel high pressure feed piping 9 substantially linearly in a given range, and maintains the pressure of the piping 9 at a given value during a steady-state operation. The constant pressure control takes place by controlling the current level of the bypass valve 120 with reference to a pressure detected by the pressure sensor 13rm. In the event a high pressure surge is applied to the rear wheel suspension, the valve releases it to the return path 11, thus buffering its transmission to the piping 8. When the ignition switch is open, and the engine as well as the pump 1 cease to operate, the energization is interrupted, whereby the piping 9 is made to communicate with the return path 11, thus decompressing.

Pressure control valves 80fr, 80fL, 80rr, 80rL deliver the required sustain pressure to output ports (84) by controlling the current level of the electrical coil (99) so that the required sustain pressure is applied to the suspension through the suspension pressure control. The transmission of a pressure surge to the suspension is buffered, thus suppressing a hunting of the pressure controlling spool (91), thus allowing the pressure applied to the suspension to be stabilized.

Cut valves 70fr, 70fL, 70rr and 70rL interrupt the suspension pressure feeding line between the output port 84 of the pressure control valve and the suspension to prevent the pressure from being released from the suspension when the line pressure (front wheel high pressure feed piping 6 or the rear wheel high pressure feed piping 9) is below a given low pressure, and fully opens the feed line whenever the line pressure is equal to or greater than the given low pressure. In this manner, the suspension pressure is automatically prevented from going abnormally low value when the line pressure is low.

Relief valves 60fr, 60fL, 60rr, 60rL limit the pressure of the suspension feed line between the output port 84 of the pressure control valve and the suspension or principally the suspension pressure to less than an upper limit so that any high pressure surge applied to the feed line or the suspension as when the vehicle is bumped or a load of high mass is thrown onto the vehicle may be released to the return path, thus buffering the impact upon the suspension and enhancing the durability of the feed line and its connected mechanical elements.

Figure 8A:
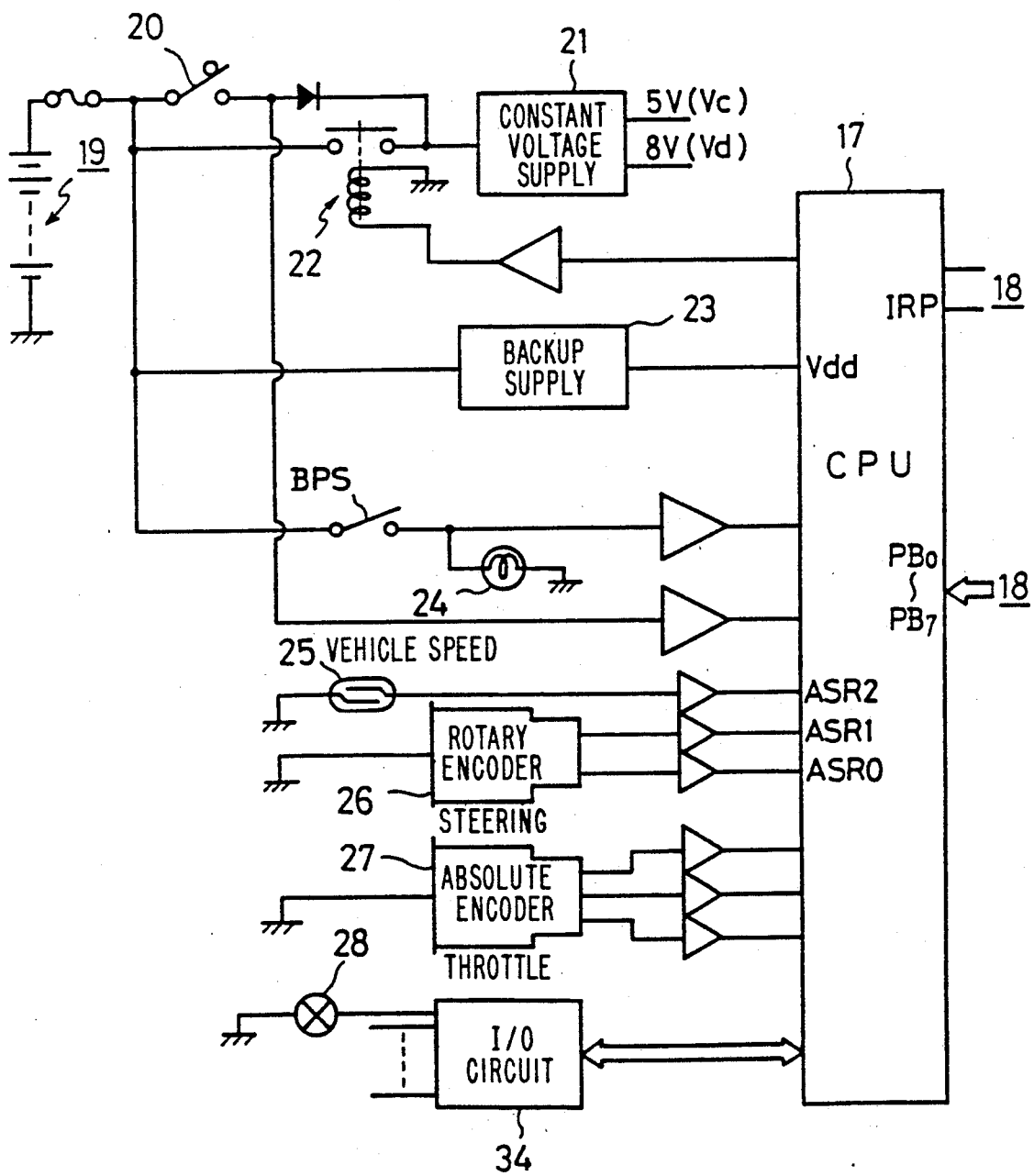
FIGS. 8a and 8b are block diagrams of an electrical control system which controls a suspension pressure in response to values detected by a vehicle elevation sensor, pressure sensor or the like, of the suspension pressure feeding system shown in FIGS. 1a and 1b, both Figures being halves of a single electrical control system.
Figure 8B:
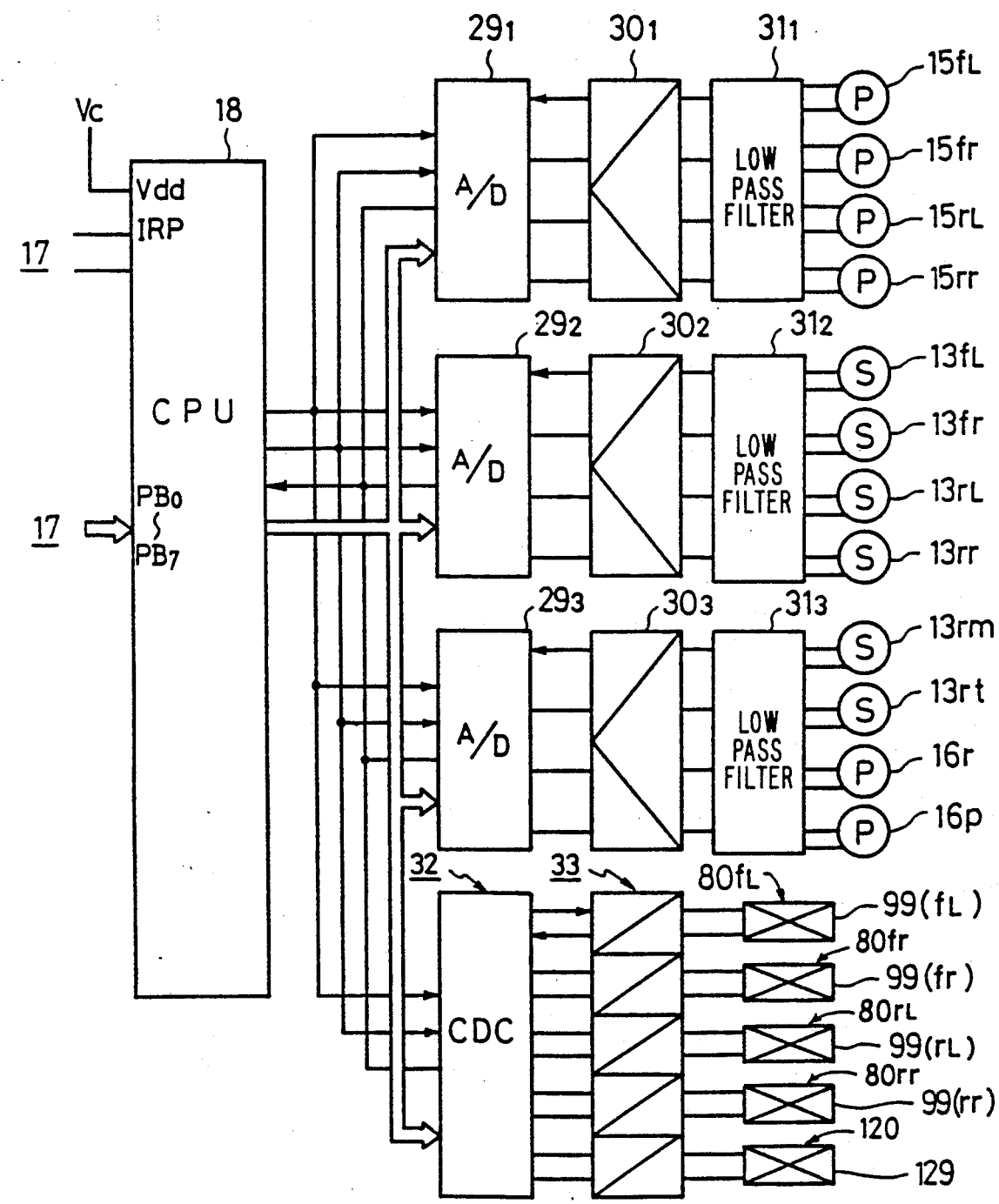

FIGS. 8a and 8b show an electrical control system which determines the driving condition and the attitude of a vehicle in response to the status of various switches and sensors mounted on the vehicle and establishes required pressures in the individual suspensions shown in FIGS. 1a and 1b so as to bring the attitude of the car body to a desired one.

Vehicle elevation sensors 15fL, 15fr, 15rL and 15rr are connected to a low pass filter $31_1$, which cuts off high frequency components or noises in an analog signal which is detected by the respective sensors, and smoothes a relatively high frequency component which is shaped to provide a vehicle elevation signal, which is then amplified to reach a given range of levels by an amplifier $30_1$ before it is applied to A/D converter (IC) $29_1$.

Pressure sensors 13fL, 13fr, 13rL, 13rr which detect the oil pressure of the individual suspensions are connected to a low pass filter $31_2$, which cuts off high frequency components or noises from an analog signal representing a pressure detected by individual pressure sensors and smoothes a relatively high frequency component, which is then shaped to provide a pressure signal, that is in turn amplified to reach a given range of levels by an amplifier $30_2$ before it is applied to A/D converter (IC) $29_2$.

Pressure sensor 13rm which detects the pressure of the rear wheel high pressure feed piping 9 and pressure sensor 13rt which detects the pressure of the rear wheel side of the return path 11 are connected to a low pass filter $31_3$, which cuts off high frequency components or noises from an analog signal representing a pressure detected by the respective pressure sensors and smoothes a relatively high frequency component to provide a shaped pressure signal, which is then amplified to reach a given range of levels by an amplifier $30_3$ before it is applied to A/D converter (IC) $29_3$.

A longitudinal acceleration sensor 16p which detects the acceleration in the fore-and-aft direction of the vehicle (a positive value representing an acceleration and a negative value representing a deceleration) and a lateral acceleration sensor 16r which detects the acceleration in the lateral direction of a vehicle (a positive value representing an acceleration directed from left to right and a negative value representing an acceleration directed from right to left) are also connected to the low pass filter $31_3$, which cuts off high frequency components or noises from an analog signal representing a pressure detected by the respective acceleration sensor and smoothes a relatively high frequency component to provide a shaped acceleration signal, which is then amplified to reach a given range of levels by an amplifier $30_3$ before it is applied to A/D converter (IC) $29_3$.

The electrical coils 99 of the pressure control valves 80fL, 8fr, 80rL, 80rr as well as the electrical coil 129 of the bypass valve 120 are connected to coil drivers 33. Each driver 33 comprises a switching circuit which is operative to energize individual electrical coil, and a current detector which detects the current level of the respective coil and produce an analog signal representing same. A duty controller (IC) 32 provides an on (energization)/off (deenergization) command. In response to the on command, the driver 33 completes the connection between a selected coil and the output of a constant current circuit. The off command causes such connection to be disconnected. Analog voltages representing the current levels detected are normally fed to A/D converter (IC) $29_3$.

The duty controller 32 receives data representing the current level to be used in the energization for each of the electrical coils (which are associated with the pressure control valves and the bypass valve) and which is supplied from a microprocessor (hereafter abbreviated as CPU) 18 and stores it in a latch, feeds a detected current level to CPU 18 through A/D converter (IC) $29_3$ for feedback purpose, controls the duty cycle so as to achieve the current level specified by CPU 18, and deliver a time sequence of on/off commands which corresponds to the duty cycle to the coil driver 33.

Each of A/D converters $29_1$ to $29_3$ is formed by an integrated circuit internally housing a sample-and-hold circuit having four input ports, except for the converter $29_3$ which is fed with analog voltages from the coil driver 33, representing detected current levels of the pressure control valve and the bypass valve. In response to a conversion command from CPU 18, the converter samples an analog voltage at its input port in its sample-and-hold circuit and converts it to digital data which may be vehicle elevation, pressure or acceleration data, which is then transferred to CPU 18 serially in synchronism with a clock pulse fed from CPU 18. The sampling, the conversion and the transfer operation take place successively with respect to the input ports 1 to 4. In this manner, a single conversion command from CPU 18 is effective to cause the converter to sample four analog voltages at its input ports successively and to transfer resulting digital data serially to CPU 18.

CPU 18 is arranged to communicate data with CPU 17, which receives a number of signals including an open (L: no pressure control command)/close (H: command) signal from a command switch SCS which commands a pressure control of the suspension; a signal from a brake pedal having H (depressed)/L (no depression) level; an open (L)/close (H) signal from the ignition switch 20; pulses from a vehicle speed synchronized pulse generator 25 which generates one pulse per incremental angle of rotation of an output shaft of an onboard transmission; a first set and a second set of pulses from a rotary encoder 26 which produces one pulse per incremental angle of rotation of a steering shaft, the pulses in the second set being 90° phase displaced from the pulses in the first set; data generated by an absolute encoder 27 coupled to the rotary shaft of a throttle valve of the engine and producing 3-bit data representing the opening of the throttle valve; and a signal from a level sensor 28 which detects the oil level in the reservoir 2 (H: below a lower limit level, L: a level higher than the lower limit level). In addition, signals from other sensors, not shown, are fed to CPU 17 through an input/output circuit 34. An indicator such as a warning light is also connected to the input/output circuit 34, and is operated by CPU 17 through the input/output circuit 34 in the event the occurrence of any abnormality in the pressure control of the suspension is determined.

An onboard battery 19 is connected to a backup power supply circuit 23 having a reduced capacity and which feeds a constant voltage to CPU 17. Accordingly, as long as the battery 19 provides an output voltage which is at or above a given value, CPU 17 is normally maintained operative to preserve data in its internal memories.

The onboard battery 19 is also connected through the ignition switch 20 to a constant voltage power supply circuit 21 having an increased capacity, which deliver constant voltages of low level to electronic elements and circuits such as CPU 18 and also delivers constant voltages of high levels to selected circuits such as low pass filters $31_1$ to $31_3$ and input/output circuit 34. The ignition switch 20 is shunted by a self-holding contact of a relay 22, which may be turned on and off by CPU 17.

Each of CPU's 17 and 18 has respective programs stored therein which controls the pressures of the suspensions. CPU 18 operates according to such program, principally operating to read values detected by vehicle elevation sensors 15fL, 15fr, 15rL, 15rr, the pressure sensors 13fL, 13fr, 13rL, 13rr, 13rm, 13rt and the onboard longitudinal and lateral acceleration sensors 16t, 16r and to control the current level which is used to energize the electrical coils 99, 129 of the pressure control valves 80fL, 80fr, 80rL, 80rr and the bypass valve 120.

By contrast, CPU 17 operates to establish or terminate the line pressure for the suspension system (FIGS. 1a and 1b), to determine the driving condition of the vehicle, and to calculate pressures required of the suspension in order to establish a vehicle elevation and vehicle attitude which are appropriate to the result of the determination during an interval from the turn-on to the turn-off of the ignition switch 20 as well as during a short time interval thereafter. At this end, CPU 17 receives various detected values from CPU 18 in order to determine the driving condition of a vehicle, and delivers the current level required for the energization to establish the required pressure to CPU 18.

TABLE 1

| register | data entered | description of data entered |
|---|---|---|
| PFL$_0$ | PfL$_0$ | initial pressure of shock absorber 101fL |
| PFR$_0$ | Pfr$_0$ | initial pressure of shock absorber 101fr |
| PRL$_0$ | PrL$_0$ | initial pressure of shock absorber 101rL |
| PRR$_0$ | Prr$_0$ | initial pressure of shock absorber 101rr |
| DPH | Dph | rear wheel pressure of high pressure line 8 |
| DPL | DpL | rear wheel pressure of return path 11 |
| SS | Ss | steering angular velocity |
| TP | Tp | throttle opening |
| ST | ST | period during which CPU 17 reads a detected value |
| VS | Vs | vehicle speed |
| PG | Pg | longitudinal acceleration (sensor 16t) |
| RG | Rg | lateral acceleration (sensor 16r) |
| DFL | DfL | vehicle elevation to front, left wheel |
| DFR | Dfr | vehicle elevation to front, right wheel |
| DRL | DrL | vehicle elevation to rear, left wheel |
| DRR | Drr | vehicle elevation to rear, right wheel |
| HT | Ht | heave target value |
| PT | Pt | pitching target value |
| RT | Rt | rolling target value |
| WT | Wt | warp target value |

Figure 9A:
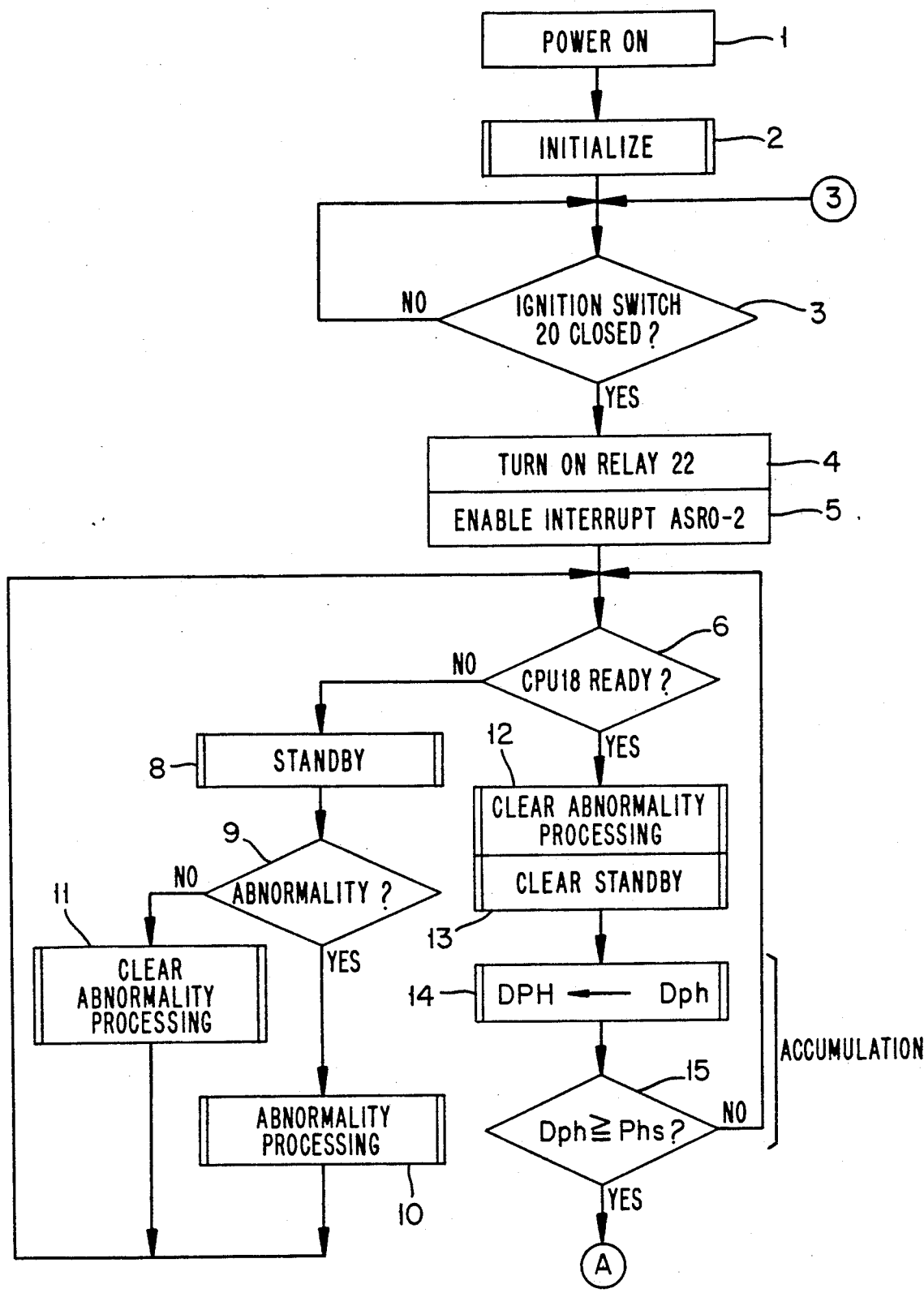

Referring to FIG. 9a and subsequent Figures, the control operation performed by CPU 17 and 18 will now be described. To facilitate the understanding, nomenclature used to designate principal registers which are assigned to internal memories in CPU 17 as well as the description of principal data which are entered in the respective registers are summarized in Table 1. It is to be understood that in the description to follow as well as in the flow charts shown in the drawings, the nomenclature used to designate the register itself may also indicate the content which is stored in the register.

Initially referring to FIG. 9a, when the power supply is turned on (step 1 where the backup power supply circuit 23 is activated to produce constant voltages or the battery 19 is mounted on the vehicle), CPU 17 initializes its internal registers, counters and timers, and deliver signal levels at its output ports which establish initial standby conditions (this involves no energization of mechanical elements) (step 2). CPU 17 then examines if the ignition switch 20 is closed (step 3), and if it remains open, it waits for the switch to be closed.

When the ignition switch 20 is closed, the coil of the relay 22 is energized to close the self-holding contacts (step 4). As a result of a closure of the ignition switch 20, the power supply circuit 21 having an increased capacity is connected to the battery 19, and operates to deliver constant voltages of low level to electronic components such as CPU 18 and other electrical circuits and to deliver constant voltages of high level to low pass filters 31$_1$ to 31$_3$ and input/output circuit 34. In this manner, CPU 18 is also electrically activated to be operative. Since the relay contacts are closed to maintain the power supply circuit 21 connected to the battery 19, the electrical circuit system shown in FIGS. 8a and 8b are entirely electrically activated to remain operative if the ignition switch 20 is subsequently opened unless the relay 22 is turned off by CPU 17.

After energizing the relay coil, CPU 17 enables an interrupt operation which is executed in response to an oncoming pulse signal to its interrupt input ports ASR0 to ASR2 (step 5).

The interrupt operation will be initially described. Considering an interrupt operation which takes place in response to a pulse generated by the vehicle speed synchronized pulse generator 25 (applied to input port ASR2), as the generator 25 generates a single pulse, CPU 17 advances to an interrupt operation (ASR2) where the content of a vehicle speed measuring register is read and the register is re-started. A vehicle speed is calculated on the basis of the content read (representing the time period for the pulses), a weighted mean Vs is derived over previous several values of the vehicle speed calculated which have been stored and the weighted mean written into a vehicle speed register VS, and then the operation returns to the main program. As a result of the execution of the interrupt operation (ASR2), data Vs representing the prevailing vehicle speed or a value which is smoothed over previous calculated values in the time sequence is always maintained in the vehicle speed register VS.

When a first set of pulses are produced by the rotary encoder 36 which detects the direction of rotation of the steering shaft to initiate the interrupt operation (input port ASR0), the interrupt operation (ASR0) is entered in response to a rising and a falling edge of the pulses in the first set. When the interrupt operation (ASR0) is entered in response to the rising edge, "H" is written into a flag register which is used to determine the direction of the register. When the interrupt operation (ASR0) is entered in response to the falling edge, the flag register is cleared (or "L" is entered), subsequently returning to the main program.

It will be seen that if a rising edge of a pulse in the second set follows the rising edge of a pulse in the first set from the rotary encoder 26 (flag register=H), this means that the steering shaft is driven to rotate counter-clockwise. On the contrary, if the falling edge of a pulse in the first set (flag register=L) is followed by the rising edge of a pulse of the second set, the steering shaft is driven for clockwise rotation.

When an interrupt operation (input port ASR1) is entered in response to a second set of pulses generated by the rotary encoder 36 which detects the rotational speed (steering angular velocity) of the steering shaft, a pulse (or its falling edge) in the second set initiates the interrupt operation (ASR1) wherein the content of a steering measuring register is read and the register re-started, (clockwise rotation) sign is applied to the read content which indicates the time period of pulses generated in synchronism with the steering angular velocity when the content of the flag register is "H" or "L", respectively, and a speed value inclusive of the direction sign is calculated therefrom, a weighted mean Ss over previous several values calculated is derived and written into a steering angular velocity register SS, and then the operation returns to the main program. As a result of the execution of the interrupt operation (ASR1), data Ss (where a positive value represents a counter-clockwise rotation while a negative value indicates a clockwise rotation) representing the prevailing steering angular velocity, as smoothed over a time sequence of calculated speed values is always maintained in the steering angular velocity register SS.

When CPU 17 has enabled the interrupt operation, it examines if CPU 18 issues a ready signal (step 6). When the power supply to CPU 18 is turned on as when the ignition switch 20 is closed or the power supply circuit 21 delivers an output of Vc=5 V, CPU 18 initializes its internal registers, counters and timers, and delivers at its output ports signal levels for establishing initial standby conditions which involves no electrical energization of mechanical elements. Data are supplied to the duty controller 32 which designate all of the electrical coils to be turned off. CPU 18 then delivers a maximum current level data which causes the full closure of the bypass valve 120, and then commands the energization of the bypass valve 120. As a result of above arrangement, the current level for all of the pressure control valves 80fL, 80fr, 80rL, 80rr are equal to zero, and a pressure equivalent to that prevailing in the return path 11 is delivered to its output port (84). Since the bypass valve 120 is in full closure and since the ignition switch 20 is closed and the pump 1 is being driven for rotation, the pressure in the high pressure feed piping 8, the front wheel high pressure feed piping 6 (accumulator 7) and the rear wheel high pressure feed piping 9 (accumulator 10) begins to rise. Subsequently, during a first period, CPU 18 reads values detected by vehicle elevation sensors 15fL, 15fr, 15rL, 15rr, the pressure sensors 13fL, 13fr, 13rL, 13rr, 13rm, 13rt, longitudinal acceleration sensor 16p and lateral acceleration sensor 16r as well as the current levels detected from the coil drivers 33, all of which are used to update its internal registers. When CPU 17 requests a transfer of detected data, such data stored in the internal registers are transferred to CPU 17. When CPU 17 delivers data representing the current levels of the pressure control valves 80fL, 80fr, 80rL, 80rr and the bypass valve 120, CPU 18 transfers it to the duty controller 32.

If CPU 17 finds at step 6 that CPU 18 delivers a busy signal, it loops around standby loop (steps 8 to 11). If CPU 18 delivers a ready signal, the standby looping is terminated (step 13).

CPU 17 requests CPU 18 to transfer detected pressure data Dph from the pressure sensor 13rm, and then receives it and writes it into register DPH (step 14), and then examines if the detected pressure Dph representing the rear wheel side pressure of the high pressure feed piping 8 has become equal to or greater than a given value Pph, which is less than a given low pressure at which the cut valves 70fL, 70fr, 70rL, 70rr begin to be opened or if the line pressure has risen to a degree (step 15). If the line pressure has not risen, the operation returns to step 6.

Figure 9B:
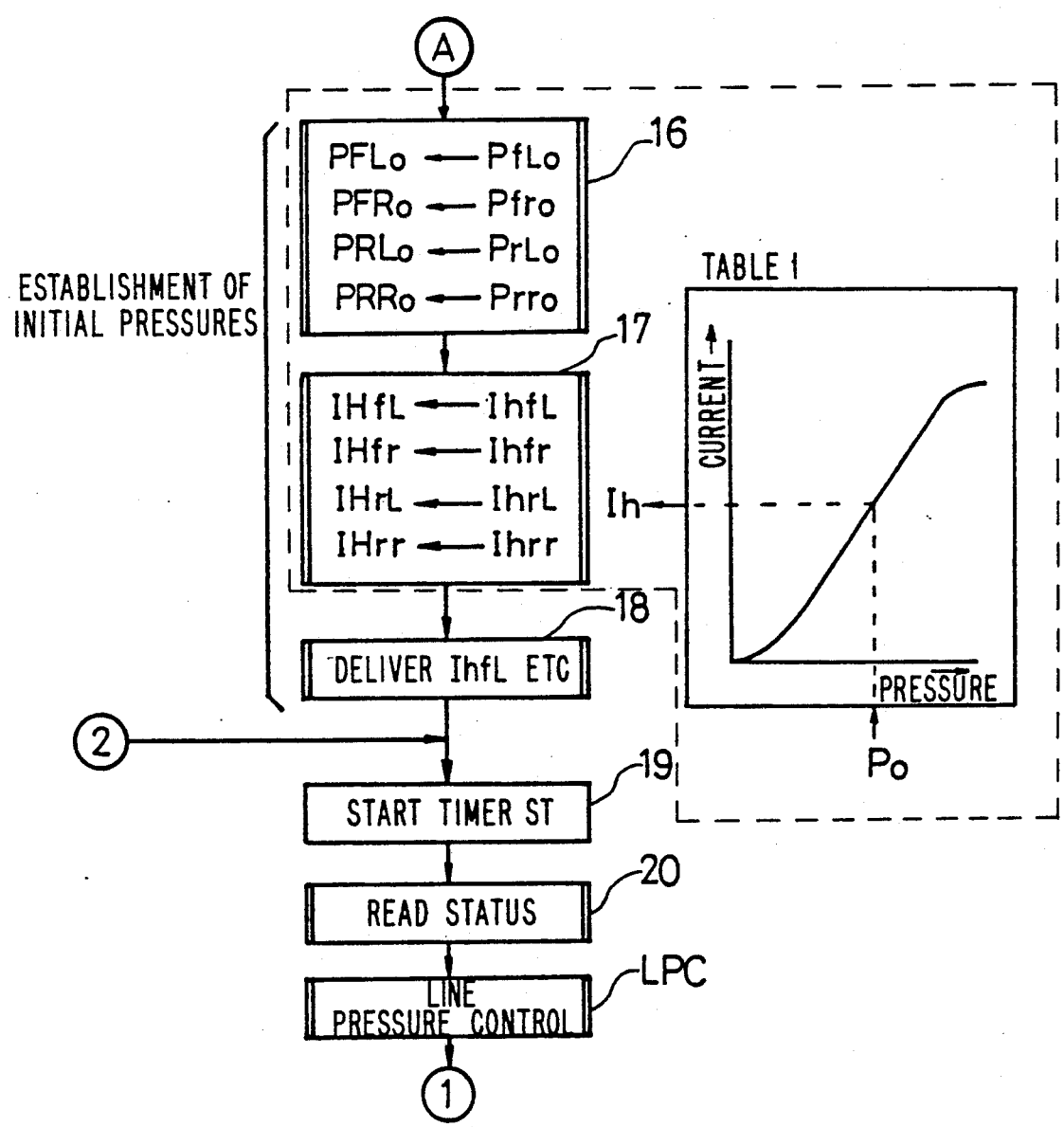

Referring to FIG. 9, when the line pressure has risen, CPU 17 commands CPU 18 to transfer data PfL$_0$, Pfr$_0$, PrL$_0$, Prr$_0$ representing the initial pressures detected by the pressure sensors 13fL, 13fr, 13rL, 13rr, which are then written into registers PFL$_0$, PFR$_0$, PRL$_0$, PRR$_0$ upon receipt.

The content PfL$_0$, Pfr$_0$, PrL$_0$, Prr$_0$ of the registers PRL$_0$, PFR$_0$, PRL$_0$, PRR$_0$ are used to access data representing the current level which is required to achieve a required pressures and which are stored in a given region (table 1) of the internal ROM, thus the reading from the table 1 the current level IhfL which is required to the coil 99 deliver the pressure PfL$_0$ to the output port 84 of the pressure control valve 80fL; the current level Ihfr which is required to deliver the pressure Pfr$_0$ to the output port of the pressure control valve 80fr; the current level IhrL required to deliver the pressure PrL$_0$ to the output port of the pressure control valve 80rL and the current level Ihrr required to deliver the pressure Prr$_0$ to the output port of the pressure control valve 80rr, all of which are written into output registers IHfL, IHfr, IHrL and IHrr (step 17). Data in these output registers are transferred to CPU 18, which delivers them to the duty controller 32 upon receipt.

The duty controller 32 stores data representing the current levels IhfL, Ihfr, IhrL and Ihrr in respective latches and then regulates the on/off duty of the coil 99 associated with the pressure control valve 80fL so that the current level which is fed back from the pressure control valve 80fL through CPU 18 becomes equal to IhfL. A time sequence of on/off commands which corresponds to such duty is applied to the coil driver 33 so as to control the pressure control valve 80fL. The duty control of the remaining pressure control valves 80fr, 80rL, 80rr takes place in a similar manner, applying a time sequence of on/off commands to the coil driver 33. When the current levels are established in this manner, the pressure control valves 80fL, 80fr, 80rL, 80rr deliver the pressures which are substantially equal to PfL$_0$, Pfr$_0$, PrL$_0$, Prr$_0$, to the output port (84) if the line pressure is equal to or greater than a given low pressure. When the cut valves 70fL, 70fr, 70rL, 70rr are opened in response to the line pressure rising to or above the given low pressure, pressures which are substantially equal to the initial pressure PfL$_0$, Pfr$_0$, PrL$_0$, Prr$_0$ of the individual suspensions are supplied through the cut valves 70fL, 70fr, 70rL, 70rr and the pressure control valves 80fL, 80fr, 80rL, 80rr to the suspensions 100fL, 100fr, 100rL, 100rr, respectively. Accordingly, when the ignition switch 20 changes from its open (the engine and the pump 1 not operating) to its closed (the pump 1 being driven) condition and the cut valves 70fL, 70fr, 70rL, 70rr are open to achieve the line pressure which is equal to or greater than the given low pressure and the oil pressure lines of the suspension communicate with the output ports of the pressure control valve, the pressures delivered by the pressure control valves will be substantially equal to the suspension pressures, preventing a rapid pressure variation in the suspensions. In other words, an impulse-like change in the attitude of the vehicle is avoided. The above description covers the establishment of initial output pressures from the pressure control valves 80fL, 80fr, 80rL, 80rr when the ignition switch 20 is changed from its open to its closed condition or immediately after the engine has started.

Subsequently, CPU 17 starts timer ST which provides a time limit ST. The content of the register ST is represented by ST, and data ST representing a second time period which is longer than the first time period during which CPU 18 reads detected values is written into the register ST.

Upon starting the timer ST, CPU 17 reads the status (step 20). Specifically, the open/close signal of the ignition switch 20, open/close signal of switch BTS which detects the depression of the brake pedal, data representing the throttle opening from the absolute encoder 27, and a signal from the reservoir level detecting switch 28 are read and written into internal registers. At the same time, CPU 17 commands CPU 18 to transfer detected data, whereby data DfL, Dfr, DrL, Drr representing the vehicle elevations detected by the sensors 15fL, 15fr, 15rL, 15rr, data PfL, Pfr, PrL, Prr, Prm, Prt representing the pressures detected by the sensors 13fL, 13fr, 13rL, 13rr, 13rm, 13rt, and data representing the detected current level of the pressure control valves 80fL, 80fr, 80rL, 80rr and the bypass valve 120 are transferred to CPU 17, which then write them into internal registers. A reference to these read value is made to render a decision concerning the abnormality/normality, and in the event an abnormality is found, the program proceeds to step 8.

In the event a normality is found, CPU 17 then executes a line pressure control (LPC). Specifically, it derives the absolute value and the polarity (high/low) of a deviation of a detected line pressure Prm with respect to a reference pressure which is a fixed value slightly less than a relief pressure (which is referred to as a given high pressure) of the relief valve 60m, and adds a correction value which reduces the deviation to zero to the current level that is currently fed to the bypass valve 120 to derive a new current level for the bypass valve 120, which is then written into an output register. The content of this output register is transferred to CPU 18 at a subsequent step 36. As a result of this line pressure control (LPC), the current level of the bypass valve 120 will be controlled so that the pressure of the rear wheel high pressure feed piping 9 assumes a given value slightly less than the relief pressure (the given high pressure) of the relief valve 60m.

Figure 9C:
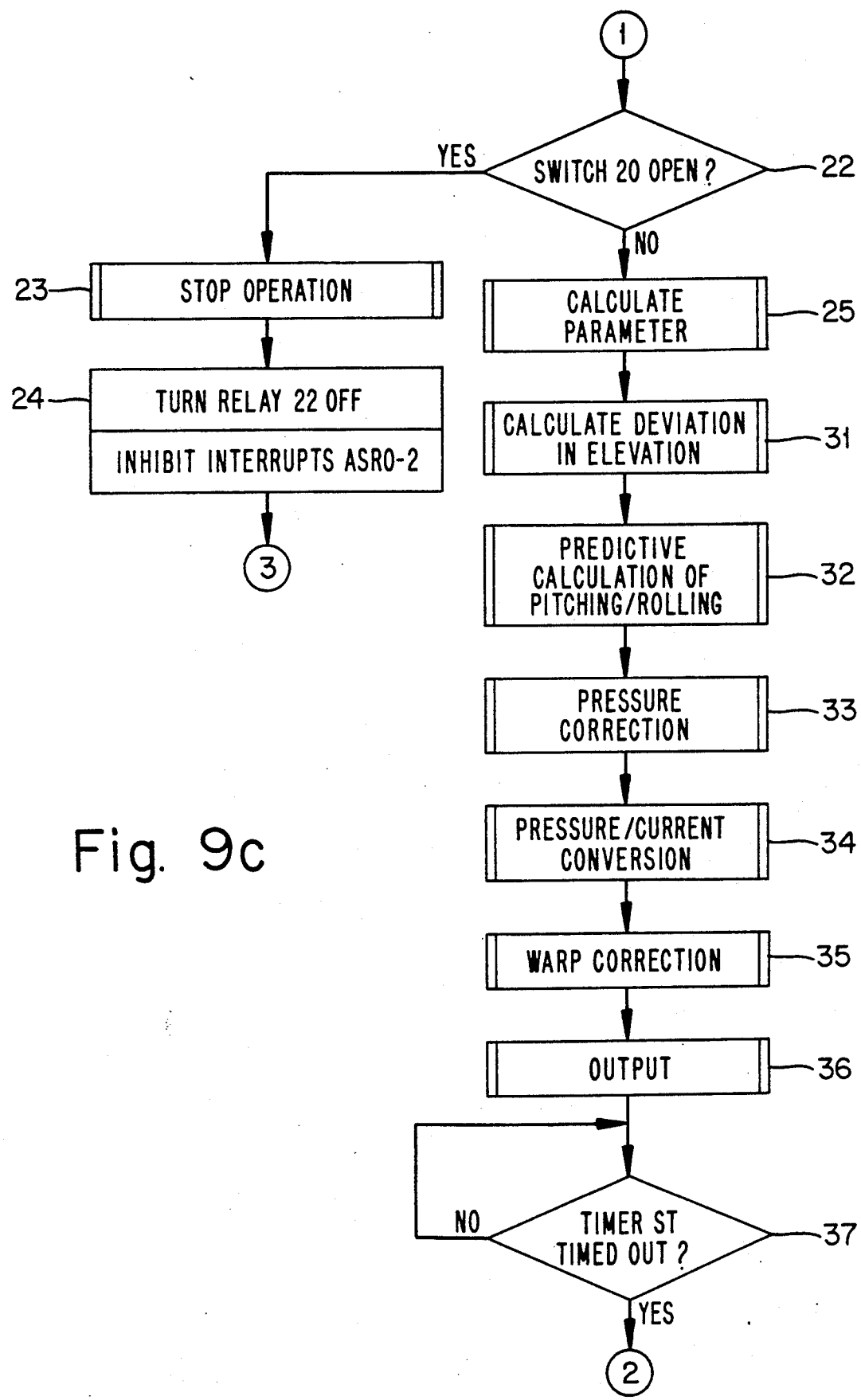

Referring to FIG. 9c, upon completion of the line pressure control (LPC) CPU 17 examines the switch 20 to see if it is open or closed (step 22), and if it is open, it executes a stop operation (step 23) where the relay 22 is deenergized and the interrupt operations (ASR0 to ASR2) are inhibited. In the stop operation (step 23), the bypass valve 120 is initially deenergized so that it becomes fully open, thus releasing the line pressure to the return path 11. When the switch 20 is open and hence the engine as well as the pump 1 cease to operate, and the discharge of a high pressure from the pump 1 ceases, the bypass valve 120 which is now fully open allows the pressures in the high pressure feed piping 8, the front wheel high pressure feed piping 6 (accumulator 7) and the rear wheel high pressure feed piping 9 (accumulator 10) to be reduced to the pressure of the return path 11, which is in turn released to the reservoir 2. Thus all of the pipings assume an atmospheric pressure. At a timing when all of the pipings reduces to or below the given low pressure at which the cut valves 70fL, 70fr, 70rL, 70rr are fully closed, CPU 17 operates to deenergize the pressure control valves 80fL, 80fr, 80rL, 80rr.

When the switch 20 is closed, a parameter representing the running condition of the vehicle is calculated (step 25). CPU 17 then executes "calculation of vehicle elevation deviation" (step 31) where a deviation of the actual vehicle elevation with respect to a target elevation is calculated, and a correction to be applied to the suspension pressures, hereafter referred to as a first correction for each of the suspensions, is calculated which reduces the deviation to zero. The detail of this operation will be described later in connection with FIGS. 10a and 10b.

"Calculation of vehicle elevation deviation" (step 31) is followed by "predictive calculation of pitching/rolling" (step 32) where a correction to the suspension pressure (which is hereafter referred to a second correction for each of the suspensions), is calculated in accordance with longitudinal and lateral accelerations which the vehicle actually experiences, thus deriving an interim value "initial suspension pressure (PfL$_0$, Pfr$_0$, PrL$_0$, Prr$_0$)+first correction+second correction". The detail of this operation will be described later in connection with FIGS. 10c and 10d.

CPU 17 then executes "pressure correction" (step 33) where the "interim value" mentioned above is again corrected in accordance with the line pressure (high pressure) detected by the pressure sensor 13rm and the return pressure (low pressure) detected by the pressure sensor 13rt. The detail of this operation will be described later in connection with FIG. 10e.

CPU 17 then effects "pressure/current conversion" (step 34) where the corrected "interim value" for each of the suspensions is converted into the current level which is to be used in energizing the pressure control valves (80fL, 80fr, 80rL, 80rr). The detail of this operation will be described later in connection with FIG. 10f.

CPU 17 then effects "correction of warp" (step 35) where a turning warp correction, representing a correction to be applied to the current level, which depends on the lateral acceleration Rg and the steering rate Ss, is calculated and is added to the current level to be applied to the pressure control valve. The detail of this operation will be described later in connection with FIG. 10g.

CPU 17 then comes to "output" (step 36) where it delivers the current levels to be applied to the respective pressure control valves which are calculated in the manner mentioned above to CPU 18 so as to be fed to the individual pressure control valves, and also deliver the current level which is to be applied to the bypass valve 120 as calculated by the "line pressure control" (LPC) to CPU 18 so as to be fed to the bypass valve 120.

At this point, CPU 17 has completed all the tasks which are contained in one cycle of the suspension pressure control. CPU 17 then waits for the timer ST to time out (step 37), whereupon it returns to step 19, re-starting the timer ST and initiating the execution of tasks in the suspension pressure control of next cycle.

In controlling the suspension pressures as described above, CPU 17 demands CPU 18 to effect a transfer of detected values from the sensors with ST period (second period) (subroutine 20). In response thereto, CPU 18 transfers sensor data to CPU 17, which is a smoothed version of a weighted mean of several past values which are read during the first period. Data representing the current levels which are to be applied to the respective pressure control valves and the bypass valve 120 are transferred from CPU 17 to CPU 18 with the ST period. In response to each transfer, CPU 18 deliver such current level data to the duty controller 32, where they are latched. Accordingly, the duty controller 32 controls the duty cycle of the energization so that the actual current levels of the pressure control valves and the bypass valve 120 as detected by the coil drivers 33, coincide with the target current levels while updating the target current levels themselves with the ST period.

Figure 10A:
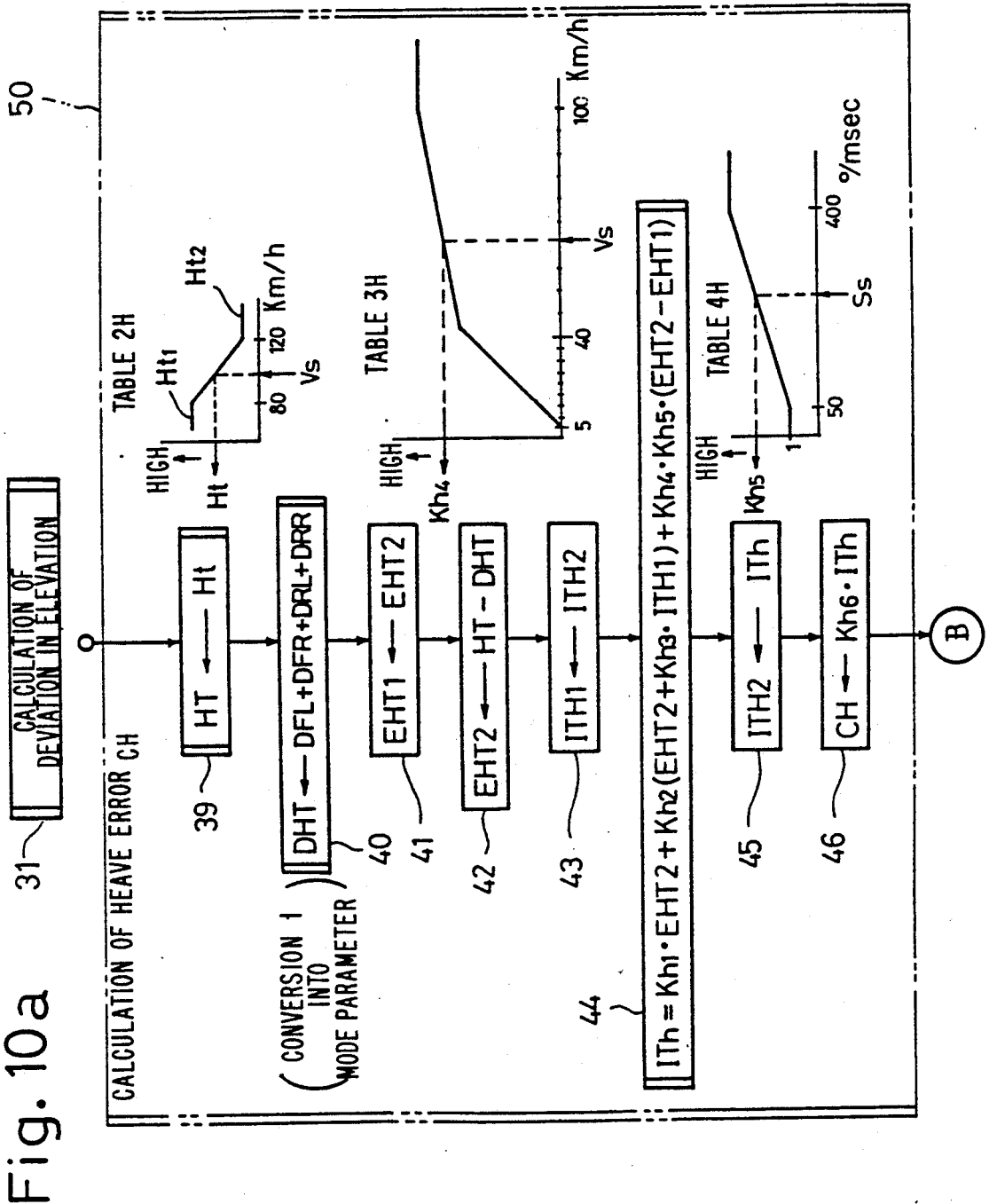
Figure 10B:
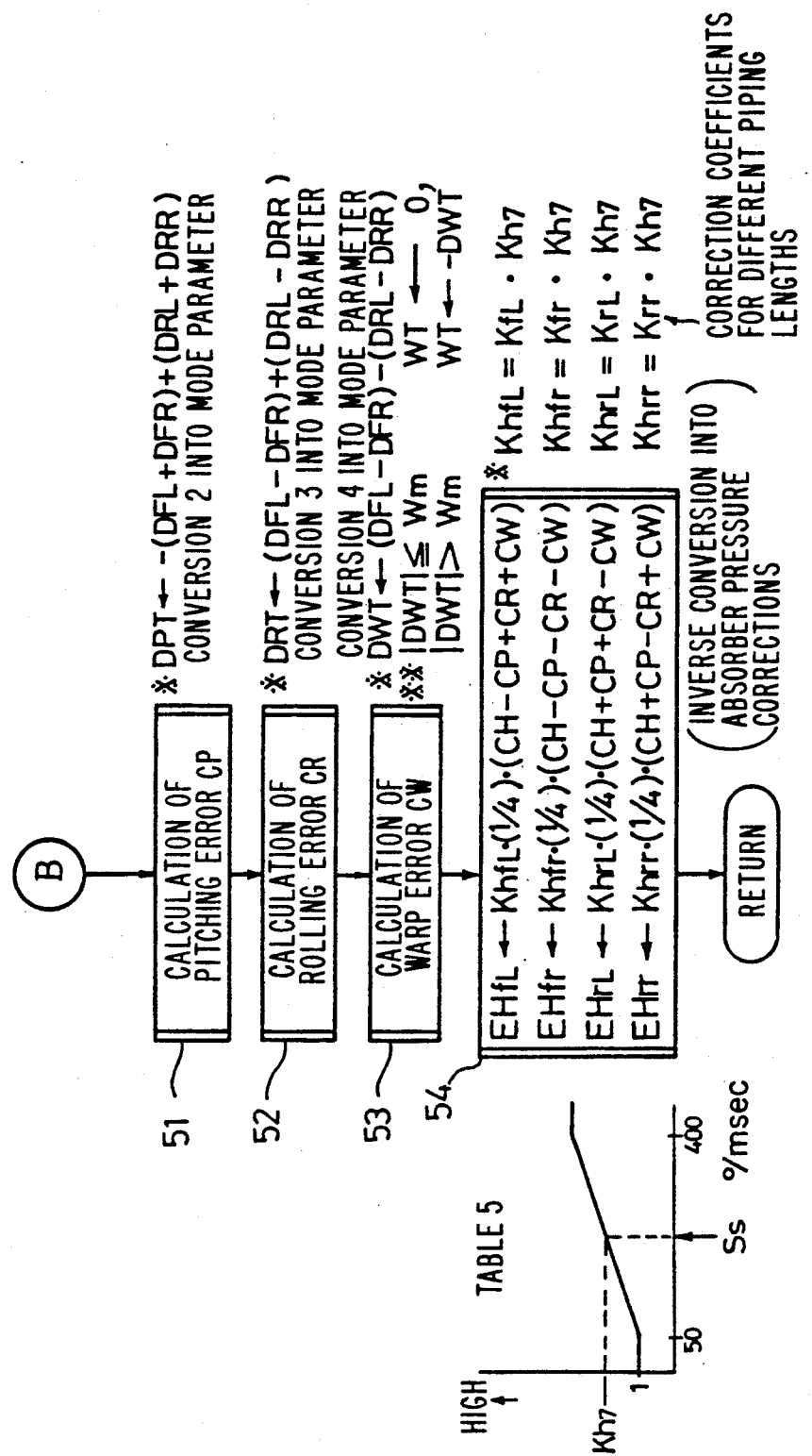

Referring to FIGS. 10a and 10b, "calculation of vehicle elevation deviation" as represented by step 31 will be described. To give a general summary initially, data DfL, Dfr, DrL, Drr, which are contents of the registers DFL, DFR, DRL, DRR, representing vehicle elevations detected by the sensors 15fL, 15fr, 15rL, 15rr are used to determine an overall vehicle heave (height) DHT, pitch DPT representing a difference in the vehicle elevation between the front wheel and the rear wheel, a roll DRT representing a difference in the vehicle elevation between the right wheel and the left wheel, a warp DWT representing a difference between the sum of the vehicle elevations of the front, right wheel and the rear, left wheel and the sum of the vehicle elevations of the front, left wheel and the rear, right wheel. Specifically, the vehicle elevations of the respective wheels as represented by the content of the registers DFL, DFR, DRL, DRR are converted into a heave DHT, a pitch DPT, a roll DRT, a warp DWT, which are attitude parameters of the overall vehicle.

$DHT = DFL + DFR + DRL + DRR$ $DPT = -(DFL + DFR) + (DRL + DRR)$ $DRT = (DFL - DFR) + (DRL - DRR)$ $$DWT=(DFL-DFR)-(DRL-DRR)$$

The calculation of the parameter DHT is executed in "calculation of heave error CH" (subroutine 50), the calculation of the parameter DPT is executed in "calculation of pitching error CP" (subroutine 51), the calculation of the parameter DRT is executed in "calculation of rolling error CR" (subroutine 52), and the calculation of the parameter DWT is executed in "calculation of warp error CW" (subroutine 53).

In the "calculation of heave error CH" (subroutine 50), a target heave Ht is derived from the vehicle speed Vs, and a heave error of the calculated heave DHT with respect to the target heave Ht is calculated. For purpose of PID (proportional, integral and differential) control, the calculated heave error is passed through PID processing, which derives a heave correction CH corresponding to the particular heave error.

Similarly, in the "calculation of the pitching error CP" (subroutine 51), a target pitch Pt is derived from the longitudinal acceleration Pg, and the pitch error of the calculated pitch DPT with respect to the target pitch Pt is calculated, and the calculated pitch error is subject to PID processing, thus deriving a pitch correction CP which depends on the particular pitch error.

Also, in the "calculation of rolling error CR" (subroutine 52), a target roll Rt is derived from the lateral acceleration Rg, and a roll error of the calculated roll DRT with respect to the target roll Rt is calculated, which is then subject to PID processing, thus deriving a roll correction CR which depends on the particular roll error.

Finally, in the "calculation of warp error CW" (subroutine 53), a target warp Wt is initially assumed to be zero, and the warp error of the calculated warp DWT with respect to the target warp Wt is calculated, and is then subject to PID processing, thus deriving a warp correction CW which depends on the particular warp error. When the calculated warp error, which is equivalent to DWT since the target warp is assumed to be zero, has an absolute value which is less than a given value representing a permissible range, the warp error which is subject to PID processing is made equal to zero. When the error exceeds the given value, the warp error which is subject to PID processing is changed to $-DWT$.

Describing the "calculation of the heave error CH" (subroutine 50) in detail, CPU 17 initially reads a target heave Ht corresponding to the vehicle speed Vs from a region (table 2H) of the internal ROM and writes it into a heave target register Ht (step 39).

As indicated by "table 2H" in FIG. 10a, the target heave Ht which is given in correspondence to the vehicle speed Vs assumes a high value Ht1 at low vehicle speed Vs equal to or less than 80 km/h, and a low value Ht2 for high vehicle speed Vs equal to or greater than 120 km/h. However, for a range of Vs between 80 and 120 km/h, the target changes linearly with respect to the vehicle speed Vs, although it may follow a curve. The purpose of linearly changing the target is to prevent a degradation in the stability of the vehicle elevation as a result of a frequent change of the vehicle speed at high speeds, which would be experienced if Vs is around 100 km/h, as a result of a stepwise variation in the target heave in response to a slight change in Vs when a target value of Ht1 is used for Vs equal to or less than 100 km/h while a target value Ht2 is used for Vs which is equal to or above 100 km/h. As utilizing the setting as shown in the table 2H, any slight change in the vehicle speed Vs will only result in a slight change in the target value, thus enhancing the stability of the vehicle elevation.

CPU 17 then calculates the heave DHT (step 40). The content of the register EHT2 in which the previously calculated heave error is written is then rewritten into register EHT1 (step 41), and the heave error of the present pass $HT-DHT$ is calculated, and is written into register EHT2 (step 42). As a consequence, the register EHT1 stores the heave error of the previous pass while the register EHT2 stores the current heave error. CPU 17 then writes the content of register ITH2 in which an error integral up to the previous pass is stored into register ITH1 (step 43), and the current PID correction ITh is calculated as follows:

$$ITh = Kh1 \cdot EHT2 + Kh2 \cdot (EHT2 + Kh3 \cdot ITH1) + Kh4 \cdot Kh5 \cdot (EHT2 - EHT1)$$

where $Kh1 \cdot EHT2$ represents the proportional term in the PID calculation, Kh1 represents a factor of proportionality and EHT2 represents the content of register EHT2 or the current heave error. $Kh2 \cdot (EHT2 + Kh3 \cdot ITH1)$ represents I (integral) term, Kh2 represents an integrating coefficient, and ITH1 represents a correction integral up to the previous pass or an integral of a correction output since the steps 16 to 18 where the initial pressure is established. Kh3 represents a weighting coefficient which relates the current error EHT2 and the correction integral ITH1 together. $Kh4 \cdot Kh5 \, (EHT2 - EHT1)$ represents a D (differential) term having a coefficient $Kh4 \cdot Kh5$, where Kh4 has a value corresponding to the vehicle speed Vs and Kh5 has a value corresponding to the steering angular velocity Ss. Thus, a vehicle speed correcting coefficient Kh4 which corresponds to the prevailing vehicle speed Vs is read from a region (table 3H) of the internal ROM, and a steering angular velocity correcting coefficient Kh5 which corresponds to the prevailing steering angular velocity Vs is read from a region (table 4H) of the internal ROM, deriving their products $Kh4 \cdot Kh5$ as the coefficient for the differential term.

As illustrated by "table 3H" in FIG. 10a, the vehicle speed correcting coefficient Kh4 may be regarded as assuming a higher value for a higher vehicle speed Vs, thus increasing the significance of the differential term. It will be seen that the differential term provides a correction which is effective to converge as rapidly to a target value as possible in response to a change in the heave. This would be accomplished by increasing the value of the coefficient in proportion to the vehicle speed inasmuch as a change in the vehicle elevation occurs rapidly in response to disturbances when the vehicle speed is higher. On the other hand, when the vehicle speed Vs exceeds a certain value which is chosen to be 40 km/h in the table 3H, it will be seen that a depression and release of a brake pedal, an operation of an accelerator pedal, a turning of a steering wheel to effect a turning or a turn-back operation, if allowed to occur rapidly, will result in a rapid and excessive change in the attitude of the car body. Accordingly, any different term which provides a rapid compensation for such a rapid change in the attitude will degrade the stability of controlling the vehicle elevation. For this reason, the vehicle speed correcting coefficient Kh4 in the table 3H is designed to allow a greater change for a low vehicle speed Vs and to allow a smaller change for a higher vehicle speed Vs. In this manner, the significance of the differential term changes greatly in response to a change in the vehicle speed when the vehicle Vs is low, but a change which occurs in the significance of the differential term in response to a change in the vehicle speed will be reduced when the vehicle speed Vs is high.

As shown at "table 4H" in FIG. 10a, the steering angular velocity correcting coefficient Kh5 can be summarized as exhibiting a greater value for a higher steering angular velocity Ss, thus increasing the significance of the differential term. This means that the differential term provides a correction which is designed so that a convergence toward the target value takes place rapidly in response to a change in the heave, and since the rate of change in the vehicle elevation in response to disturbances increases as the steering angular velocity Ss is higher, the differential term is designed to be enhanced in accordance with the steering angular velocity. On the other hand, for a steering angular velocity Ss equal to or less than a certain value, which is chosen to be 50°/msec in the table 4H, a change in the travelling direction takes place very slowly, and accordingly the significance of the differential term is chosen small. For a velocity in excess of 50°/msec and not exceeding 400°/msec, a change in the vehicle elevation takes place at a rate which is substantially proportional to the steering angular velocity Ss. At or above an angular velocity of 400°/msec, a change in the attitude of a vehicle will occur very rapidly and excessively, and any differential term which provides a rapid and excessive compensation for such rapid change in the attitude will degrade the stability of controlling the vehicle elevation. For this reason, the coefficient Kh5 for the differential term is chosen to be a constant value for Ss equal to or less than 50°/msec, and is made relatively high in substantial proportion to Ss when the latter exceeds 50°/msec until 400°/msec is reached, and again assumes a constant value at or above 400°/msec.

The introduction of the differential term Kh4·Kh5 (EHT2−EHT1) and the choice of the coefficient Kh4 which increases with the vehicle speed Vs and of the coefficient Kh5 which increases with the steering angular velocity Ss achieve a differential control over the weighting in accordance with the vehicle speed Vs and the steering angular velocity Ss to accomplish a high stability control over the vehicle elevation in response to a change in the vehicle speed Vs and the steering angular velocity Ss.

When the heave error correction ITh is calculated in a PID calculation subroutine (step 44), CPU 17 then writes the calculated heave error correction ITh into register ITH2 (step 45), and multiplies it by a weighting coefficient Kh6, representing a weighting relative to a pitch error correction, a roll error correction, and a warp error correction, which will be described later, or stated differently, a specific contribution in the total correction, and writes the result into heave error register CH.

After the execution of the subroutine 50 to calculate the heave error CH, CPU 17 executes the subroutine t1 to calculate the pitching error CP. The pitch error correction CP is calculated in the similar manner as the calculation of the heave error CH, and CPU 17 writes it into pitch error register CP. A pitch target value PT which corresponds to a heave target value HT is obtained by reading data Pt, representing a target value depending on the longitudinal acceleration Pg, from one region (table 2P) of the internal ROM.

Figure 11A:
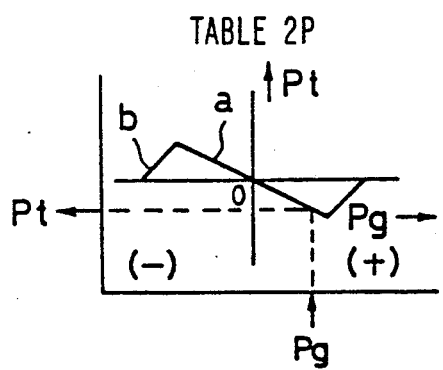

FIG. 11a shows the content of the table 2P. The pitch target value Pt which corresponds to the longitudinal acceleration Pg acts to cancel the pitch which would appear as a result of the longitudinal acceleration Pg. The purpose of a region a is to increase the target pitch as the longitudinal acceleration Pg increases, thereby achieving a power saving. The purpose of a region b to prevent any abnormality of the sensor in response to an abnormal value of Pg from providing a pitch target value even though there is no Pg developed in actuality, by reducing the pitch target value. In other respects, the operation which occurs in this subroutine is similar to the subroutine 50 to calculate the heave error CH. Specifically, HT, Ht in step 39 may be replaced by PT, Pt; the equation to calculate DHT at step 40 may be replaced by the foregoing equation to calculate DPT; EHT1, EHT2 appearing in step 41 may be replaced by EPT1, EPT2; EHT2, HT, DHT appearing in step 42 may be replaced by EPT2, PT, DPT; ITH1, ITH2 appearing in step 43 may be replaced by ITP1, ITP2; the equation to calculate ITh in the subroutine 44 may be replaced by a corresponding equation to calculate the pitch error correction ITp; table 3H may be replaced by a coefficient table (3P) which is used to calculate the pitch correction ITp; the table 4H may be replaced by a coefficient table (4P) which is used to calculate the pitch correction ITp; ITH2, ITh appearing in step 45 may be replaced by ITP2, ITp; and CH, Kh6, ITh appearing in step 46 may be replaced by CP, Kp6, ITp. In this manner, a flow chart showing the subroutine 51 to calculate the pitch error CP in detail can be obtained. CPU 17 executes the processing operation represented by such flow chart.

Then CPU 17 executes the subroutine 52 to calculate the rolling error CR, and the rolling correction CR is calculated in the similar manner as the heave error CH, and is then written into rolling error register CR. In this instance, a roll target value RT corresponding to the heave target value HT may be obtained by reading data Rt which corresponds to the lateral acceleration Rg from one region (Table 2R) of the internal ROM.

Figure 11B:
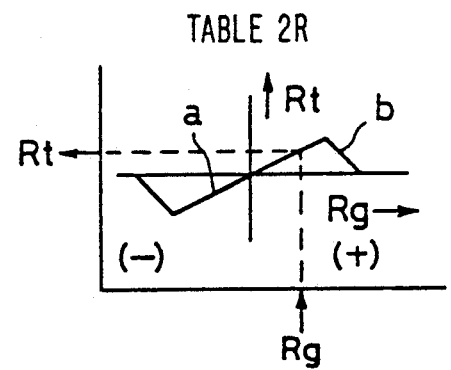

FIG. 11b shows the content of the table 2R. The roll target value Rt which corresponds to the lateral acceleration Rg acts in a direction to cancel the roll which would be developed as a result of the lateral acceleration Rg. The purpose of a region a is to increase the target roll as the lateral acceleration Rg increases, thereby achieving a power saving. The purpose of a region b is to prevent any abnormality of a sensor which responds to an abnormal value of Rg from providing a roll target value even though no Rg is developed in actuality, by reducing the roll target value. In other respects, the operation in this subroutine is similar to the subroutine 50 to calculate the heave error CH mentioned above.

Specifically, HT, Ht at step 39 may be replaced by RT, Rt; the equation to calculate DHT appearing in step 40 may be replaced by a foregoing equation to calculate DRT; EHT1, EHT2 in step 41 may be replaced by ERT1, ERT2; EHT2, HT, DHT in step 42 may be replaced by ERT2, RT, DRT; ITH1, ITH2 in step 43 may be replaced by ITR1, ITR2; the equation to calculate ITh in the subroutine 44 may be replaced by a corresponding equation to calculate a roll error correction ITr; the table 3H may be replaced by a coefficient table (3R) which is used to calculate the roll correction ITr; the table 4H may be replaced by a coefficient table (4R) which is used to calculate the roll correction ITr; ITH2, ITh appearing in step 45 may be replaced by ITR2, ITr; and CH, Kh6, ITh appearing in step 46 may be replaced by CR, Kr6, ITr. In this manner, a flow chart indicating the subroutine 51 to calculate the roll error CR in detail may be obtained, and is executed by CPU 17.

CPU 17 then executes the subroutine 53 to calculate the warp error CW. The warp error correction CW is calculated in the similar manner as the heave error CH is calculated, and is then written into warp error register CW. A warp target value Wt corresponding to the heave target value Ht is chosen to be equal to zero. In other respects, the operation in this subroutine is similar to the subroutine 50 to calculate the heave error CH mentioned above. Specifically, HT, Ht in step 39 may be replaced by WT, 0; the equation to calculate DHT at step 40 may be replaced by the foregoing equation to calculate DWT; EHT1, EHT2 at step 41 may be replaced by EWT1, EWT2; the content of step 42 is modified to a content which specifies WT to be 0 when the absolute value of DWT is equal to or below a given value Wm or a permissible range, specifies WT to be $-TWT$ when Wm is exceeded and writes WT into register TWT2; ITH1, ITH2 at step 43 may be replaced by ITW1, ITW2; the equation to calculate ITh at the subroutine 44 may be replaced by a corresponding equation to calculate the warp error correction ITw; the table 3H may be replaced by a coefficient table (3W) which is used to calculate the warp correction ITw; the table 4H may be replaced by a coefficient table (4W) which is used to calculate the warp correction ITw; ITH2, ITh at step 45 may be replaced by ITW2, ITw; and CH, Kh6, ITh in step 46 may be replaced by CW, Kw6, ITw. In this manner, a flow chart which represents the subroutine 53 to calculate the warp error CW in detail is obtained, and is executed by CPU 17.

When the heave error correction CH, the pitch error correction CP, the roll error correction CR, the warp error correction CW have been calculated, CPU 17 converts these corrections into suspension pressure correction EHfL (for the suspension 100fL), EHfr (for suspension 100fr), EHrL (for suspension 100rL) and EHrr (for suspension 100rr) for each of the wheels; thus, the suspension pressure correction is calculated as follows:

$$EHfL = KfL \cdot Kh7 \cdot (\tfrac{1}{4}) \cdot (CH - CP + CR + CW)$$

$$EHfr = Kfr \cdot Kh7 \cdot (\tfrac{1}{4}) \cdot (CH - CP - CR - CW)$$

$$EHrL = KrL \cdot Kh7 \cdot (\tfrac{1}{4}) \cdot (CH + CP + CR - CW)$$

$$EHrr = Krr \cdot Kh7 \cdot (\tfrac{1}{4}) \cdot (CH + CP - CR + CW)$$

Coefficients KfL, Kfr, KrL, Krr are correction coefficients which compensate for differences among suspension feed pressures due to differential lengths of the pipings leading to the suspensions 100fL, 100fr, 100rL, 100rr with respect to the line pressure reference 13rm and the return pressure reference 13rt. Kh7 represents a coefficient which increases or decreases a vehicle elevation deviation correction in accordance with the steering angular velocity Ss, and is read as a function of the steering angular velocity Ss from one region (table 5) of the internal ROM. It is expected that there will be a greater change in the attitude when the steering angular velocity Ss is high, so that the error in the attitude will also increase. Accordingly, the coefficient Khs is chosen to be substantially proportional to the steering angular velocity Ss. However, for a steering angular velocity Ss which is below a given level, which is chosen to be 50°/msec in the table 5, a change in the travelling direction will occur very slowly as is a change in the attitude. For a velocity Ss above 50°/msec and below 400°/msec, a change in the attitude will occur at a rate which is substantially proportional to the steering angular velocity Ss. At a steering angular velocity exceeding 400°/msec, a change in the attitude of the vehicle will occur very rapidly and excessively, and any excessive correction which rapidly compensates for such a rapid change in the attitude will degrade the stability of controlling the vehicle elevation. Accordingly, the correction coefficient Kh7 as a function of the steering angular velocity Ss is chosen to be a constant value for Ss at or below 50°/msec, to assume a high value which is substantially proportional to Ss for a range from 50°/msec to 400°/msec, and again assume a constant value which it assumes at 400°/msec when the velocity exceeds 400°/msec.

Figure 10C:
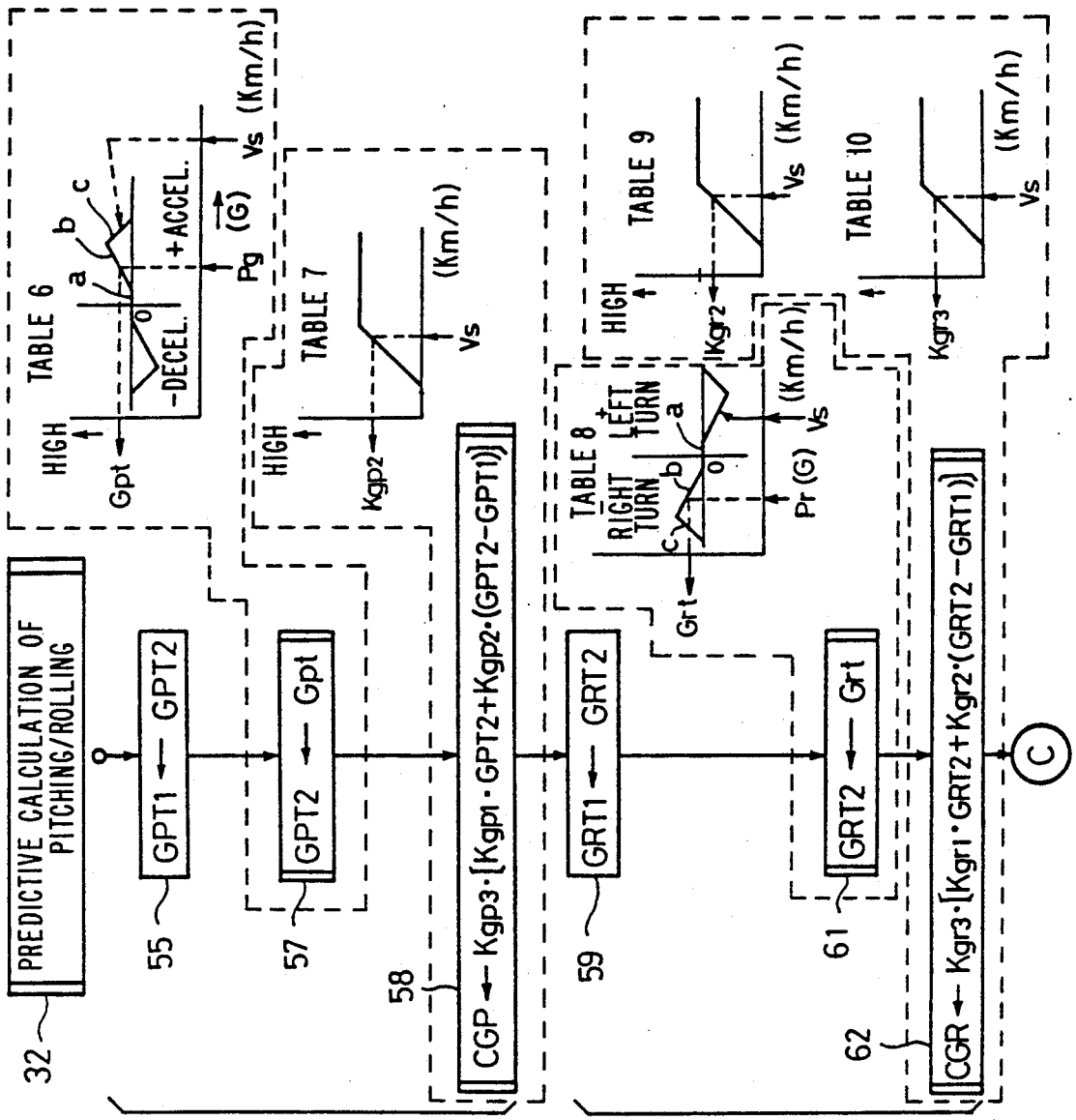
Figure 10D:
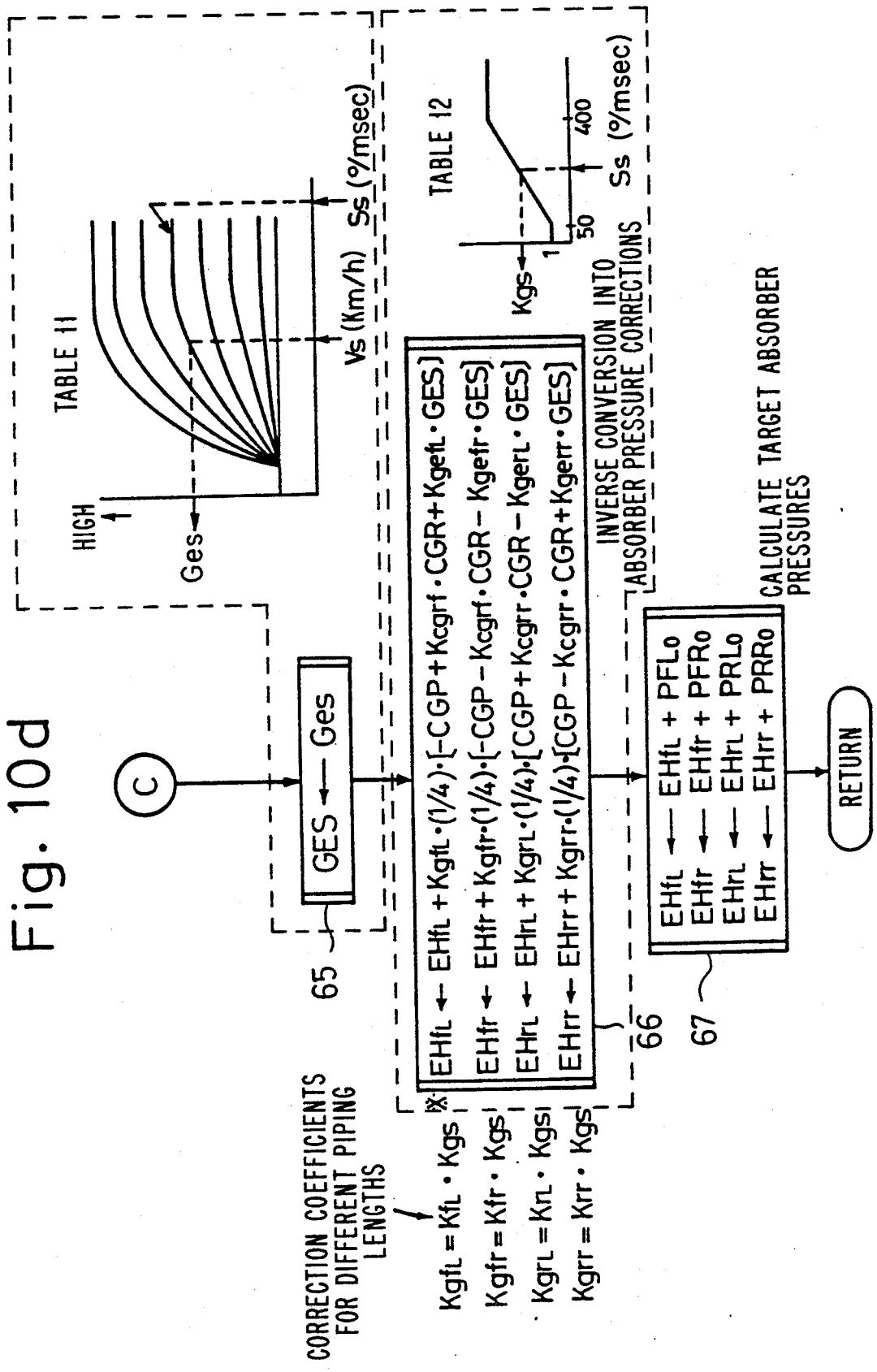

Referring to FIGS. 10c and 10d, the subroutine 32 which effects a predictive calculation of pitching/rolling will be described more specifically. The preceding subroutine 31 to calculate a deviation of vehicle elevation has served substantially regulating the suspension pressures, through a feedback control by determining the current vehicle elevation as well as the current attitude of the car body on the basis of the longitudinal and the lateral acceleration in order to maintain a proper attitude of the car body. By contrast, the subroutine 32 which effects a predictive calculation of pitching/rolling principally serves controlling the longitudinal and the lateral acceleration of the car body, thus suppressing a change in the longitudinal acceleration Pg and the lateral acceleration Rg of the car body.

Initially, CPU 17 calculates a correction CGT which is used to suppress a change in the pitch which is caused by a change in the longitudinal acceleration Pg (steps 55 to 58). At this end, the content of register GPT2 which stores the correction corresponding to Pg during the previous pass is written into register GPT1 (step 55), and a correction Gpt corresponding to Vs and Pg is read from one region (table 6) of the internal ROM and is written into register GPT2 (step 57). Data Gpt from the table 6 is specified for groups of Vs as index. Accordingly, CPU 17 initially specifies a particular group of Vs, and then reads data Gpt corresponding to Pt in a specified group. For each group, a deadband a has a width, as indicated by the horizontal width where Gpt0=0 in the table 6 shown in FIG. 10c, which is greater for a group having lesser values of Vs. In a region b, the gain is increased with an increase in the longitudinal acceleration Pg, thus enhancing the control performance. In a region c, the control performance is suppressed because of the likelihood that an abnormality is occurring with a sensor or sensors.

CPU 17 then calculates the correction CGP which is used to suppress a change in the longitudinal acceleration Pg according to the following equation, and writes it into register CGP (step 58):

$$CGP = Kgp3 \cdot [Kgp1 \cdot GPT2 + Kgp2 \cdot (GPT2 - GPT1)]$$

GPT2 represents the content of register GPT2, and represents the correction Gpt which is now read from the table 6. GPT1 represents the content of register GPT1, and is the correction which was read from the table 6 during the previous pass. P (proportional) term Kgp1·GPT2 has a factor of proportionality Kgp1.

D (differential) term Kgp2·(GPT2−GPT1) has a coefficient Kgp2, which is read from one region (table 7) of the internal ROM in correspondence to the vehicle speed Vs. "Table 7" in FIG. 10c illustrates generally that the coefficient Kgp2 assumes a greater value for a greater value of the vehicle speed Vs, thus increasing the significance of the differential term. This is because the differential term represents a correction which tends to suppress rapidly a change in the longitudinal acceleration Pg. This is because since the greater the vehicle speed, any change which occurs in the longitudinal acceleration Pg as a result of a depression or release of a brake pedal, the operation of an accelerator pedal or a turning or turn back of a steering wheel occurs more rapidly, and hence such rapid change must be suppressed rapidly. On the other hand, for a vehicle speed Vs which exceeds a certain value, the depression or release of a brake pedal, the operation of an accelerator pedal or a turning or turn back of a steering wheel, if allowed to take place rapidly, will cause a very rapid and excessive change in the longitudinal acceleration Pg, and an excessive differential term which provides a rapid suppression of such rapid change will degrade the stability of suppressing the longitudinal acceleration. Accordingly, the coefficient Kgp2 in the table 7 is chosen to undergo a large variation when the vehicle speed Vs is low and assumes a constant value at and above a given value of the vehicle speed Vs. In this manner, the significance of the differential term changes greatly in response to a change in the vehicle speed, but the significance of the differential term ceases to change in response to a change in the vehicle speed when the vehicle speed Vs is high.

The calculated correction CGP which is used to suppress a change in the longitudinal acceleration Pg represents a pitch correction with respect to the suspension, and Kgp3 represents a weighting factor applied to roll corrections CGR and GES which will be described later.

CPU 17 then calculates a correction CGR which is used to suppress a change in the roll as caused by a change in the lateral acceleration or thus to suppress a change in the lateral acceleration Pg (steps 59 to 62). The content of register GRT2 which stores the correction corresponding to Rg which is obtained during the previous pass is written into register GRT1 (step 59), and a correction Grt corresponding to Vs and Rg is read from one region (table 8) of the internal ROM and is written in register GRT2 (step 61). The data Grt in the table 8 is specified for groups of Vs as an index. Accordingly, CPU 17 specifies a particular group of Vs, and then reads data Grt corresponding to Rg within the specified group. Each group has a deadband a having a width, as indicated by the lateral dimension of the line representing Grt=0 in the table 8 shown in FIG. 10c, which is greater for a group of Vs having lesser values. The purpose of a region b is to increase the gain with an increased in the lateral acceleration Rg, thus enhancing the control performance. In a region c, the control performance is suppressed because of the likelihood that an abnormality is occurring with a sensor or sensors.

CPU 17 then calculates a correction CGR which is used to suppress a change in the lateral acceleration Rg according to the following equation, and writes it into register CGR (step 62):

$$CGR = Kgr3 \cdot [Kgr1 \cdot GRT2 + Kgr2 \cdot (GRT2 - GRT1)]$$

GRT2 represents the content of register GRT2, and is a correction Grt which is read from the table 8 during the current pass. GRT1 is the content of register GRT1, and is a correction which was read from the table 8 during the previous pass. P (proportional) term Kgr1·GRT2 has a factor of proportionality Kgr1.

D (differential) term Kgr2·(GRT2−GRT1) has a coefficient Kgr2, which is read from one region (table 9) of the internal ROM in correspondence to the vehicle speed Vs. Generally, the coefficient Kgr2 has a greater value for a greater value of vehicle speed Vs, thus increasing the significance of the differential term. This is because the differential term represents a correction to suppress a change in the lateral acceleration Rg rapidly. It is desired to suppress any rapid change in the lateral acceleration Rg caused by a turning or turn back of a steering wheel for higher values of the vehicle speed. On the other hand, for a vehicle speed Vs exceeding a certain value, the lateral acceleration Rg will change rapidly and excessively, if a turning or turn back of a steering wheel takes place rapidly. Any excessive differential term which is effective to provide a rapid suppression of such rapid change will degrade the stability of the suppressing of the lateral acceleration. Accordingly, the coefficient Kgr2 in the table 9 is chosen to undergo a large variation for low values of the vehicle speed Vs, and assumes a constant value for vehicle speed Vs which exceeds a given value. In this manner, the significance of the differential term changes greatly in response to a change in the vehicle speed when the vehicle speed Vs is low, but ceases to change when the vehicle speed Vs is higher.

The calculated correction CGR represents a roll correction for the suspension and Kgr3 represents a weighting factor applied to pitch correction CGP mentioned above and a roll correction GES which will be described later. Since the rate of change in the lateral acceleration Rg is low for low values of the vehicle speed Vs, the specific contribution of the roll correction CGR is reduced in a low speed range while the roll correction is given a constant value in a high speed range. The coefficient data Kgr3 is stored as a function of the vehicle speed Vs in one region (table 10) of the internal ROM so as to achieve such relationship. CPU 17 reads the coefficient Kgr3 corresponding to the speed Vs for use in the calculation of the correction CGR.

The lateral acceleration Rg changes in response to a change in the steering position or the steering angular velocity Ss, and the rate at which such change occurs also depends on the vehicle speed Vs. In other words, a change in the lateral acceleration Rg depends on both the steering angular velocity Ss and the vehicle speed Vs. Accordingly, a roll correction Ges which is required to suppress such change is written into one region (table 11) of the internal ROM of CPU 17. Referring to FIG. 10d, a roll correction Ges corresponding to a particular combination of Vs and Ss is read from the table 11, and is written into register GES (step 65). If it is substantially equal to zero, indicating that the steering angular velocity of the previous pass is equal to that of the current pass, the roll correction Ges read during the previous pass may be used as the roll correction for the current pass, and hence no updating of register GES (step 65) takes place.

CPU 17 then converts the calculated pitch correction CGP, roll correction CGR and the roll correction GES into the pressure corrections for each of the suspensions, and adds such pressure corrections to the values EHfL, EHfr, EHrL, EHrr (the content of registers EHFL, EHFR, EHRL, EHRR) which have been calculated during the subroutine 31, and utilize their sums EhfL, Ehfr, EhrL, Ehrr to update registers EHfL, EHfr, EHrL, EHrr (step 66).

$$EhfL = EHfL + KgfL \cdot (\tfrac{1}{2}) \cdot (-CGP + Kcgrf \cdot CGR + KgegL \cdot GES)$$

$$Ehfr = EHfr + Kgfr \cdot (\tfrac{1}{2}) \cdot (-CGP - Kcgrf \cdot CGR - Kgefr \cdot GES)$$

$$EhrL = EHrL + KgrL \cdot (\tfrac{1}{2}) \cdot (CGP + Kcgrr \cdot CGR - KgerL \cdot GES)$$

$$Ehrr = EHrr + Kgrr \cdot (\tfrac{1}{2}) \cdot (CGP - Kcgrr \cdot CGR + Kgerr \cdot GES)$$

The first term on the right side represent values calculated during the subroutine 31 which were written into registers EHfL, EHfr, EHrL, EHrr while the second term on the right side represents the pitch correction CGP, the roll correction CGR and the roll condition GES mentioned above which have been converted into pressure corrections for the respective suspensions. The coefficients KgfL, Kgfr, KgrL and Kgrr appearing in the second term of the right hand are related as follows:

$$KgfL = KfL \cdot Kgs$$

$$Kgfr = Kfr \cdot Kgs$$

$$KgrL = KrL \cdot Kgs$$

$$Kgrr = Krr \cdot Kgs$$

KfL, Kfr, KrL, Krr are coefficients which are used to correct pressure errors caused by variations among the piping length leading to the respective suspension with respect to the pressure reference while Kgs represents a coefficient which has a predetermined relationship with the steering angular velocity Ss as indicated in the table 12 and which defines a weighting factor applied to the pressure correction which is calculated in the subroutine 32 and used to suppress a change in the acceleration such as the second term in the right of above four equations, $(\tfrac{1}{2}) \cdot (-CGP + KcgrL \cdot CGR + KgefL \cdot GES)$, relative to the pressure correction calculated in the subroutine 31. Since it is expected that a change in the acceleration will occur rapidly for a greater value of the steering angular velocity Ss, it is preferred to choose a greater weighting factor for the pressure correction which is used to suppress a change in the acceleration. Accordingly, the coefficient Kgs is generally chosen to be greater in proportion to the steering angular velocity Ss. However, for a steering angular velocity Ss, at or below a given level, which is chosen to be 50°/msec in the table 12, a change in the acceleration will be minimal. For a range from 50°/msec to 400°/msec, the acceleration will change at a rate which is substantially proportional to the steering angular velocity Ss. For a steering angular velocity exceeding 400°/msec, a change in the turning radius will occur rapidly and excessively, causing an excessively large change in the acceleration in particular in the lateral acceleration. An excessive correction which provides a rapid compensation of such a rapid change in the acceleration will degrade the stability of controlling the acceleration. Accordingly, the weighting factor Kgs is chosen as a function of the velocity Ss. Specifically, it assumes a constant value for Ss at or below 50°/msec, and assumes a higher value which is substantially proportional to Ss for a range from 50°/msec to 400°/msec, and again assumes a constant value which is equivalent to the value reached at 400°/msec when 400°/msec is exceeded.

CPU 17 then adds the initial pressure data which are stored in the initial pressure registers $PFL_0$, $PFR_0$, $PRL_0$, $PRR_0$ and which have been determined at steps 16 to 18 to the sum of the correction pressure used to regulate a deviation in the vehicle elevation and the correction pressure used to control suppressing the acceleration which is calculated in a subroutine 66 (the content of registers EHfL, EHfr, EHrL, EHrr), thus determining the pressures to be applied to the individual suspensions and updating registers EHfL, EHfr, EHrL, EHrr with these values (step 67).

Referring to FIG. 10e, the subroutine 33 which effects "pressure correction" will be described. CPU 17 writes the pressure Dph (the content of register DPH) detected by the pressure sensor 13rm into register PD (step 68). CPU 17 reads a correction coefficient Kpd corresponding to the pressure of the rear wheel high pressure feed piping 9 from one region (table 13) of the internal ROM and writes it into register KPD (step 69).

As shown in table 13 in FIG. 10e, the pressure correction coefficient Kpd is established in inverse proportion to the pressure Dph of the rear wheel high pressure feed piping 9 = DPH = PD.

After reading the pressure correction coefficient Kpd, CPU 17 adds Kpd·(100−PD) to the content of registers EHfL, EHfr, EHrL, EHrr (if PD exceeds 100, the actual operation will be a subtraction), and updates registers EHfL, EHfr, EHrL, EHrr with the resulting sum (step 71).

If it is found in the subroutine 33 of "pressure correction" that the pressure PD of the rear wheel high pressure feed piping 9 (as well as the high pressure feed piping 8 and front wheel high pressure feed piping 6) is equal to or greater than 60 kg/cm$^2$ and less than 100 kg/cm$^2$, Kpd·(100−PD) is added to the target absorber pressure (a value established at step 67) in order to compensate for a low pressure error (100−PD). If the pressure PD is equal to or greater than 100 kg/cm$^2$, |Kpd·(100−PD)| is subtracted from the target absorber pressure in order to compensate for a high pressure error (100−PD). This provides a pressure which is substantially equal to the target pressure and in which a reduction in the output pressure from the pressure control valves 80fr, 80fL, 80rr, 80rL which is caused by a pressure variation in the piping 9 is compensated for or cancelled, and such pressure is delivered to each of the suspensions 100fr, 100fL, 100rr, 100rL. In this manner, a variation in the suspension pressure which results from the pressure variations of the high pressure feed pipings 6, 8, 9 is diminished.

Referring to FIG. 10f, the subroutine 34 for "pressure-current conversion" will be described in detail. CPU 17 reads current levels IhfL, Ihfr, IhrL, Ihrr which are to be applied to the pressure control valves 80fL, 80fr, 80rL, and 80rr, respectively, in order to produce the pressures indicated by data EHfL, EHfr, EHrL and EHrr of registers EHfL, EHfr, EHrL, EHrr from pressure/current conversion table 1, and write them into current output registers IHfL, IHfr, IHrL and IHrr (step 34).

Figure 10G:
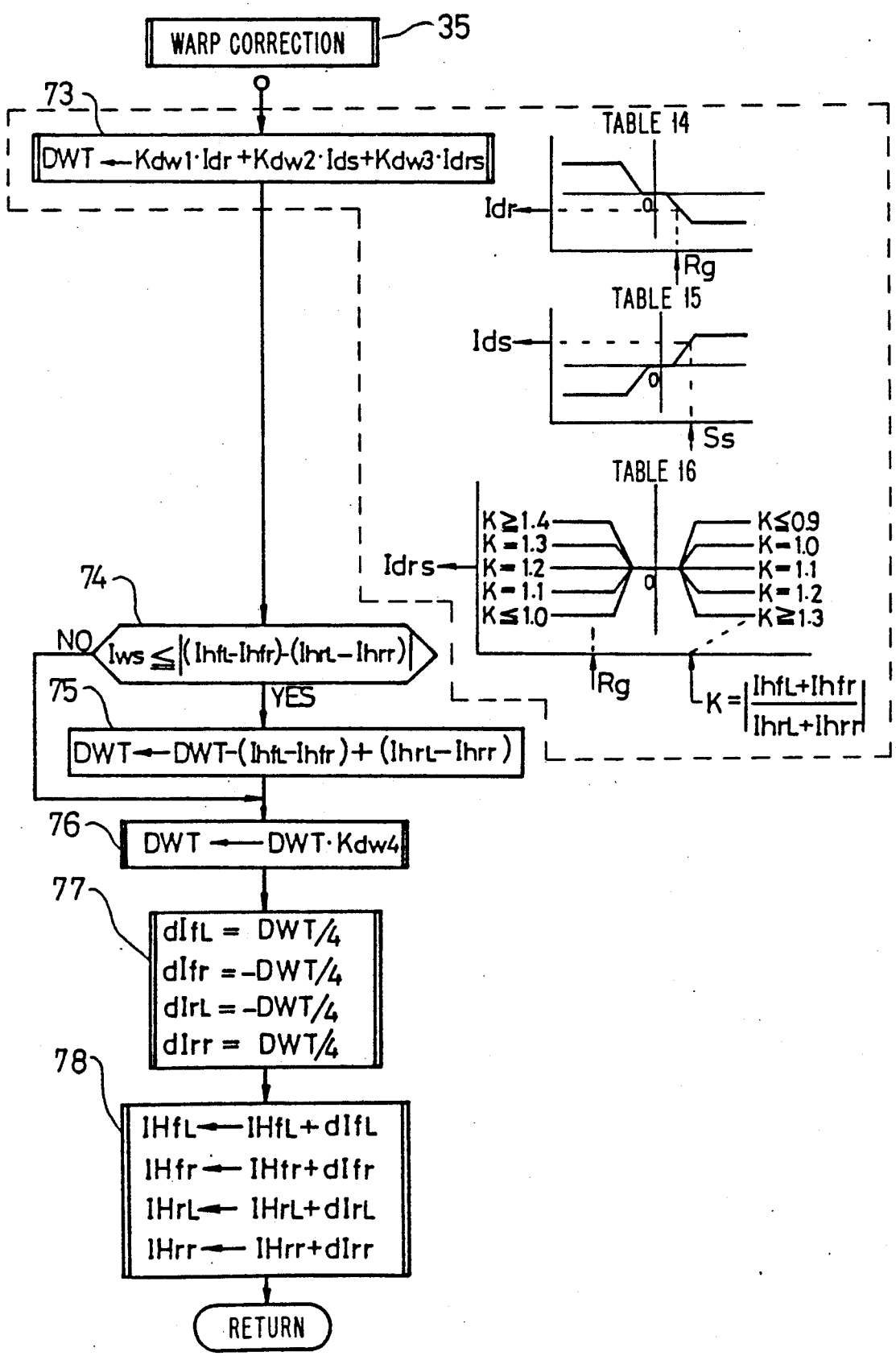

Referring to FIG. 10g, the subroutine 35 for "warp correction" will now be described. In the subroutine 35, an appropriate target warp DWT is calculated on the basis of the lateral acceleration Rg and the steering angular velocity Ss (step 73), and a warp which would result when the content of registers IHfL, IHfr, IHrL, IHrr is delivered is also calculated. Its error warp with respect to the target warp DWT is calculated (steps 74 to 76), and current corrections dIfL, dIfr, dIrL, dIrr which are required to reduce the error warp to zero are calculated (step 77), and these current corrections are added to the content of registers IHfL, IHfr, IHrL, IHrr, with these registers updated by the resulting sum (step 78).

One region (table 14) of the internal ROM of CPU 17 has warp target values Idr stored therein in a manner corresponding to the magnitude of the lateral acceleration Rg. Also table 15 has warp target values Ids stored therein which correspond to the steering angular velocity Ss. Table 16 has warp corrections Idrs stored therein which correspond to the inclination of the car body in the fore-and-aft direction as well as the lateral acceleration Rg (representing the inclination in the lateral direction) as defined by the values in registers IHfL, IHfr, IHrL, IHrr which are to be delivered. It is to be understood that the inclination in the fore-and-aft direction is indicated as follows:

$$K = |(IhfL + Ihfr)/(IhrL + Ihrr)|$$

Table 16 includes groups of data corresponding to different magnitudes of K, and data in each group is given in correspondence to the lateral acceleration Rg.

CPU 17 reads warp target value Idr corresponding to the lateral acceleration Rg from table 14, reads warp target value Idr corresponding to the steering angular velocity Ss, and reads the warp correction Idrs corresponding to the inclination in the fore-and-aft direction as well as in the lateral direction, as defined by the values in registers IHfL, IHfr, IHrL, IHrr from table 16, and calculates warp target value DWT as follows (step 73):

$$DWT = Kdw1 \cdot Idr + Kdw2 \cdot Ids + Kdw3 \cdot Idrs$$

CPU 17 then calculates a warp, which is defined as follows:

$$(IhfL - Ihfr) - (IhrL - Ihrr)$$

as defined by the content of registers IHfL, IHfr, IHrL, IHrr, and examines if it remains within a permissible range or deadband (step 74). If it is out of the permissible range, the calculated warp (IhfL−Ihfr)−(IhrL−Ihrr) is subtracted from the target warp DWT, and the result is written into a warp error correction register DWT (step 75). If it remains within the permissible range, the content (DWT) of the register DWT remains unchanged. The warp error correction DWT (the content of register DWT) is multiplied by the weighting factor Kdw4 to provide a product, which is used to update register DWT (step 76). The warp error correction DWT is converted into a correction for each of the suspension pressures, or more exactly, a correction to be applied to the current setting of the respective pressure control valve which corresponds to the pressure correction (step 77), and the resulting correction is added to the content of current output registers IHfL, IHfr, IHrL, IHrr (step 78).

Data from these current output registers IHfL, IHfr, IHrL, IHrr are transferred to CPU 18 so as to be supplied to the pressure control valves 80fL, 80fr, 80rL, 80rr during the output subroutine 36, and CPU 18 applies them to the duty controller 32.

It will be seen from the foregoing description that in the first embodiment of the invention, electrical energization means (32, 33) electrically energizes the pressure control valve (80fr) so that a pressure value (EHfr) commanded by the command means (17) is applied to the suspension (100fr). In this manner, a pressure which corresponds to the command (EHfr) from the command means (17) is established in the suspension (100fr).

When the pressure of the high pressure feed piping (6) decreases, correction means (17) corrects the pressure value (EHfr) commanded by the command means (17) in a manner corresponding to the pressure (PD) detected by the pressure detecting means (13rm). Specifically, if the detected pressure is lower, the pressure value is corrected to a higher value so that the command value [EHfr+Kpd·(100−PD)] applied to the electrical energization means (32, 33) is higher than the pressure value (EHfr) commanded by the command means (17), whereby a pressure which is substantially equal to the pressure value (EHfr) or the target pressure commanded by the command means (17) and for which a reduction in the output pressure from the pressure control valve (80fr) as caused by a pressure fall in the high pressure piping (6) is compensated for or cancelled is applied to the suspension (100fr). In this manner, any reduction in the suspension pressure which is caused by a pressure fall of the high pressure feed piping (6) is diminished. In other words, a variation in the suspension pressure which results from the pressure variation of the high pressure piping (6) is diminished.

SECOND EMBODIMENT

A second embodiment of the invention employs a hardware which is substantially identical to the one used in the first embodiment. The suspension pressure control performed by CPU 17 in the second embodiment remains essentially the same as before, except that the "pressure correction" subroutine 33 shown in FIG. 10e for the first embodiment is replaced by a subroutine shown in FIG. 12 in the second embodiment.

Figure 12:
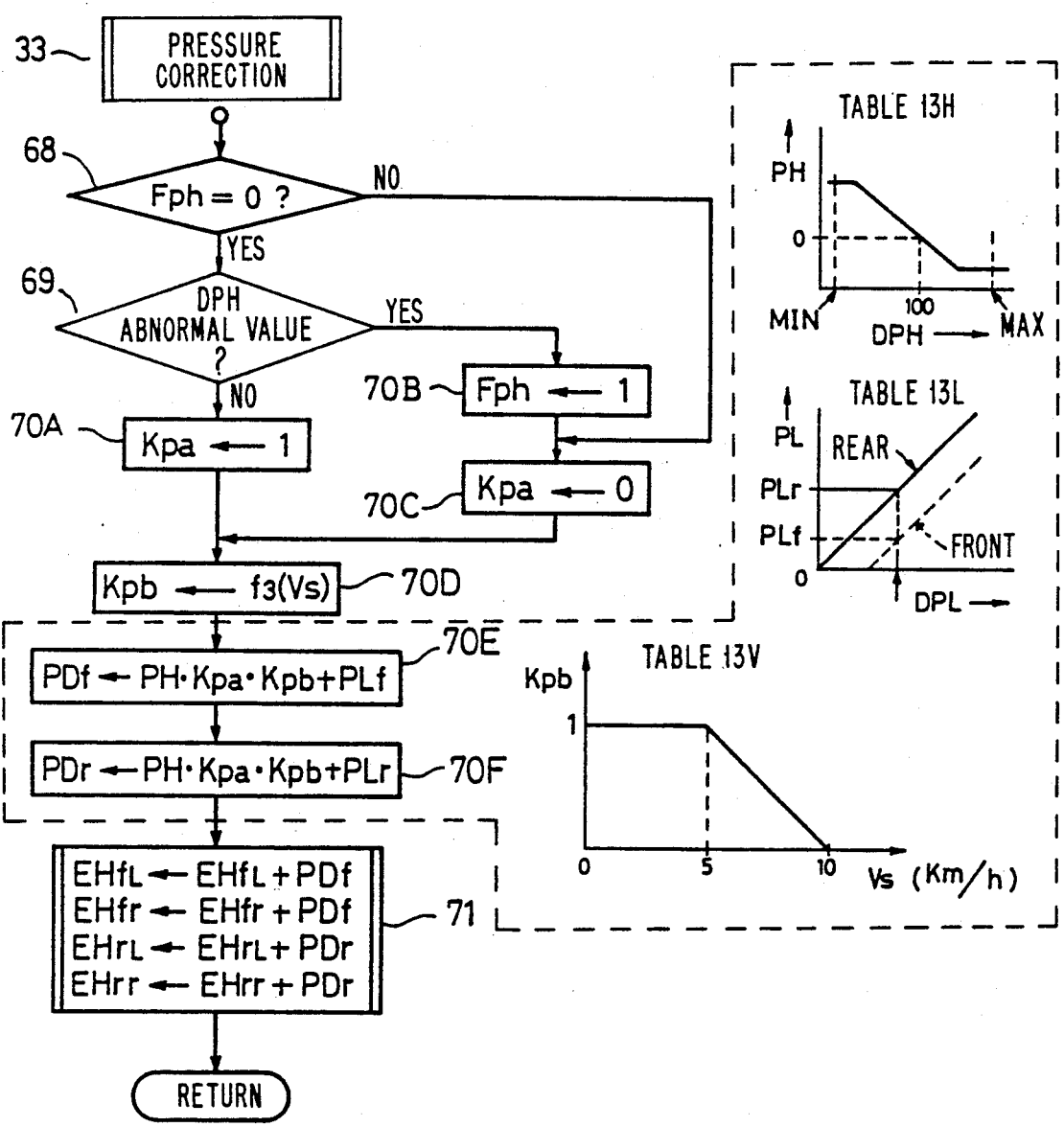
FIG. 12 is a flow chart illustrating a pressure corrective operation by the microprocessor 17 according to a second embodiment of the invention.

Specifically, in the subroutine 33 shown in FIG. 12, CPU 17 compensates for a variation in the output pressure from the pressure control valve as caused by a variation in the line pressure in a manner corresponding to the detected pressure Dph (content of register DPH) from the pressure sensor 13rm, and also compensates for a variation in the output pressure from the pressure control valve as caused by a variation in the return pressure in a manner corresponding to the detected pressure DpL (content of register DPL) from the pressure sensor 13rt.

A correction PH shown at step 70E, 70F, varies with the magnitude of the detected pressure Dph in order to compensate for a variation in the line pressure, and is read optionally as desired from table 13H which is stored in one region of the internal ROM using Dph as a parameter.

Corrections PLf and PLr shown at steps 70E and 70F are used to compensate for a variation in the output pressure from the pressure control valve which is caused by a variation in the return pressure. These variables represent the correction for the front and the rear wheel. The corrections PLf and PLr are read, as required, from a table 13L which is stored in one region of the internal ROM.

The correction for the return pressure is provided separately for the front and the rear wheel, because the front wheel is located nearer the reservoir while the rear wheel is located remote therefrom. Since the pressure sensor 13rt is allocated for detection of the low pressure and operates to detect the return pressure from the front wheel, there will be a relative large difference in the return pressure between from the rear and the front wheel, resulting in an error, which must be minimized.

In the pressure correction subroutine shown in FIG. 12, there is included an accommodation for the failure of the pressure sensor 13rm which detects the line pressure. In this embodiment, the pressure sensor 13rm is designed so that its output voltage remains within a given range or between MAX and MIN shown in FIG. 13H if the sensor is operating normally. If the output voltage goes out of this range, it is determined that the sensor has failed. By way of example, if a short-circuit or breakage occurs in the pressure sensor 13rm, its output voltage changes rapidly. In the pressure correction subroutine of FIG. 12, the pressure applied to the suspension is modified in accordance with the pressure detected by the sensor 13rm, and hence in the event an abnormality occurs with the detected pressure, the pressure applied to the suspension will change accordingly, causing an abnormal vehicle elevation.

To accommodate for this, in the second embodiment, when the detected pressure DPH remains within a range defined between MIN and MAX in the table 13H, step 70A is executed in which a coefficient Kpa is made equal to 1. However, if the pressure DPH goes out of the range, the program proceeds from the step 69 to 70B where a flag Fph is set, followed by a next step 70C where the coefficient Kpa is made equal to 0.

Pressure corrections PDf and PDr are calculated at steps 70E and 70F, respectively, but since the correction PH which is responsive to the detected pressure has no influence upon PDf and PDr when the coefficient Kpa is equal to 0, in the event the pressure sensor 13rm fails, no modification of the suspension pressure takes place in response to a detected abnormal value, thus preventing the likelihood that the vehicle elevation may be raised or lowered in an abnormal manner.

It will be seen that when the vehicle is running on an uneven road, the consumption or flow rate of oil which passes from the high pressure piping 8 to the low pressure piping 11 through the pressure control valves 80fL, 80fr, 80rL, 80rr will increase, causing a shortage of oil supply from the pump 1 to the high pressure piping, and thus causing a reduction in the line pressure of the latter below its normal value. If an attempt is made to increase the current switching of the pressure control valve in order to compensate for such reduction in the pressure, the pilot chamber 88 in the pressure control valve will become closed, accompanying a pressure rise in the pilot chamber, whereby the spool 90 will shift toward the line pressure port 82, providing a communication between the line pressure port and the output port 84. In this instance, the pressure applied to the suspension tends to depend on the line pressure, causing vertical oscillations of the car body even though its magnitude is relatively low, thus degrading a comfortability.

The reason that the line pressure port 82 and the output port 84 may be maintained in communication with each other will be specifically described with reference to FIG. 3. The pressure of the output port 84 communicating with the suspension will rise as a result of its communication with the high pressure port 82 to which the line pressure is applied, if the spool 90 moves to the left. Conversely, if the spool 90 moves to the right, the output port 84 communicates with the low pressure port 85 to which the reservoir pressure is applied, whereby its pressure will fall. The pressure from the output port 84 is applied to the left end face of the spool 90. The line pressure applied to the high pressure port 87 is normally reduced by the fixed restriction 88f, and is applied to the right end face of the spool 90 as the target pressure. If the output pressure is less than the target pressure, the spool will be driven to the left, whereby the output pressure will rise as a result of the high pressure fluid which is supplied from the high pressure port 82. On the other hand, if the output pressure is higher than the target pressure, the spool 90 will be driven back to the right, whereby the fluid passes to the low pressure port 85, thus lowering the output pressure. In this manner, the spool moves so as to achieve a balance between the output and the target pressure, thus bringing the output pressure into coincidence with the target pressure. Accordingly, if the suspension pressure fluctuates rapidly and repeatedly, as when the vehicle is running on an uneven road, a movement of the spool to the left and to the right will be repeated frequently, which gives rise to a pressure release from the high pressure line 8 to the low pressure line 11 through the pressure control valve, thus causing a reduction in the pressure of the high pressure line 8.

If the line pressure decreases below its normal value when the vehicle is running on an uneven road, an attempt to raise the target pressure above the line pressure by pressure compensation will cause the needle 95 to close the restriction 94 completely, removing a pressure drop across the restriction 88f and resulting in the target pressure which is equal to the line pressure. However, the target pressure cannot exceed the output pressure, which is equal to the line pressure in this instance, and the spool 90 which has once moved to the left cannot be driven back to the right, so that the spool 90 remains stationary while maintaining a communication between the high pressure port 82 and the output port 84. Consequently, the line pressure is continually applied to the output port 84. In this instance, the suspension pressure varies with the variation in the line pressure, causing vertical oscillations of the car body. In this instance, since the pressure regulation by the suspension pressure control substantially fails to function, when wheels are impacted by bumps, the suspension pressure will undergo a rapid change, causing a large variation in the vehicle elevation. In addition, since the variable restriction 94 is fully or nearly closed, the relationship between the drive imparted by the solenoid 99 which adjusts the opening of the variable restriction 94 and the target pressure will become non-linear, and the target pressure will vary largely in response to a small movement of the needle 95. This makes a control of the target pressure very unstable, causing an instability in the movement of the spool 93. This causes the vehicle elevation to change and also sounds of oscillation or percussion of the spool 93 will be audible.

In the second embodiment, to accommodate for this, the pressure corrections PDf, PDr which follow a change in the line pressure are varied in dependence upon the vehicle speed Vs. Specifically, when the vehicle speed Vs is close to zero, the occurrence of a racing, for example, is likely. In this instance, the line pressure will increase to an abnormal value, and hence there is a likelihood that the vehicle elevation will change largely unless a sufficient compensation for the line pressure is made. However, during normal running conditions when the vehicle speed is above a given value, there is no likelihood of a racing occurring, and an increased compensation for a change in the line pressure would rather cause a problem as experienced when the vehicle is running on an uneven road.

In this embodiment, the pressure correction PH is adjusted using the coefficient Kpd at steps 70E and 70F, and the value of the coefficient Kpd is varied depending on the vehicle speed Vs in a manner illustrated by table 13V. Values of Kpd which are allocated for different values of the vehicle speed Vs, as indicated by the table 13V, are stored in one region of ROM. A compensation PH which depends on a change in the line pressure is equal to zero when the vehicle speed Vs is equal to or greater than 10 km/h since Kpd=0.

When CPU 17 calculates the corrections PDf, PDr at steps 70E, 70F, respectively, it adds these corrections to the content of registers EHfL, EHfr, EHrL, EHrr, thus updating them (step 70).

According to the second embodiment, if the vehicle is running normally, for example, at a vehicle speed of 40 km/h, the controlling compensation (Kpd) which responds to a change in the line pressure is equal to zero, so that a condition of the pressure control valve which maintains a communication between the high pressure port 82 and the output port 84 will not occur even when the vehicle is running on an uneven road. Thus, if the wheels are impacted by bumps, the pressure from the output port 84 or the suspension pressure will be above the target value, whereby the spool 90 moves to the right, as viewed in FIG. 3, causing the oil which has entered the output port 84 of the pressure control valve will be discharged to the low pressure port 85, thus alleviating a rapid rise in the suspension pressure and suppressing a variation in the vehicle elevation. The variable restriction 94 cannot be closed fully, but remains at its intermediate opening, which is substantially proportional to the current level of the solenoid, thus preventing an instability of the control over the target pressure.

If the pressure sensor 13rm should fail and provides an erroneous detected voltage, the coefficient Kpa appearing in the equations shown at steps 70E and 70F become equal to zero, nullifying the pressure correction PH term which is based on the pressure DPH detected by the pressure sensor 13rm and preventing a wrong correction of the suspension pressure in response to a failure of the sensor 13rm.

While preferred embodiments of the invention have been illustrated and described, it is to be understood that there is no intention to limit the invention to the precise constructions disclosed herein and the right is reserved to all changes and modifications coming within the scope of the invention as defined in the appended claims.

What we claimed is:

1. Pressure control system for suspension comprising a pressure source for supplying a fluid which is drawn from a reservoir to a high pressure piping under a high pressure which delivers a hydraulic fluid to a suspension which is adapted to extend and shrink in response to a pressure supplied thereto;

a pressure control valve including a line pressure port communicating with the high pressure piping, a low pressure port communicating with a low pressure, an output port for delivering a pressure to the suspension, a target pressure space communicating with the high pressure piping through an orifice, a spool responsive to a pressure from the output port applied to its one end to be driven in a direction to reduce a degree of communication between the line pressure port and the output port and to increase a degree of communication between the low pressure port and the output port and also responsive to a pressure from the target pressure space applied to its other end to be driven in a direction to increase a degree of communication between the line pressure port and the output port and to reduce a degree of communication between the low pressure port and the output port, a valve element for defining a degree of communication between the target pressure space and the low pressure, and electrical drive means for driving the valve element in a direction to increase/decrease the degree of communication;

pressure detecting means for detecting a pressure in the high pressure piping;

command means for commanding a pressure value to be applied to the suspension;

correction means for correcting the pressure value from the command means in a manner dependent on the pressure detected by the pressure detecting means so as to increase the output value when detected pressure is low;

and electrical energization means for electrically energizing the pressure control valve in accordance with the pressure value as corrected by the correction means so as to deliver a pressure corresponding to the pressure value to the suspension.

2. Pressure control system according to claim 1 in which the correction means derives a compensating value proportional to a deviation of the pressure detected by the pressure detecting means from a predetermined standard value and adds the compensating value to the pressure value from the command means to provide a corrected pressure value.

3. Pressure control system according to claim 2 in which a ratio of the compensating value to the deviation assumes a relatively high, constant value when the pressure detected by the pressure detecting means is equal to or less than a first predetermined value, assumes a relatively small, constant value when the detected pressure is equal to or greater than a second predetermined value which is greater than the first value, and assumes a value between the both constant values which is inversely proportional to the pressure detected by the pressure detecting means when the detected pressure is between the first and the second value.

4. Pressure control system for suspension comprising an onboard pressure source for supplying a fluid which is drawn from a reservoir to a high pressure piping under a high pressure which delivers a hydraulic fluid to an onboard suspension which is adapted to extend and shrink in response to a pressure supplied thereto;

a pressure control valve including a line pressure port communicating with the high pressure piping, a low pressure port communicating with a low pressure, an output port for delivering a pressure to the suspension, a target pressure space communicating with the high pressure piping through an orifice, a spool responsive to a pressure from the output port applied to its one end to be driven in a direction to reduce a degree of communication between the line pressure port and the output port and to increase a degree of communication between the low pressure port and the output port and also responsive to a pressure from the target pressure space applied to its other end to be driven in a direction to increase a degree of communication between the line pressure port and the output port and to reduce a degree of communication between the low pressure port and the output port, a valve element for defining a degree of communication between the target pressure space and the low pressure, and electrical drive means for driving the valve element in a direction to increase/decrease the degree of communication;

pressure detecting means for detecting a pressure in the high pressure piping;

vehicle speed detecting means for detecting a vehicle speed;

command means for commanding a pressure value to be applied to the suspension;

correction means for correcting the pressure value from the command means in accordance with a pressure detected by the pressure detecting means and a vehicle speed detected by the vehicle speed detecting means so as to increase the pressure value to a higher value when the detected pressure is high and to reduce the pressure value to a low value when the vehicle speed is high;

and electrical energization means for electrically energizing the pressure control valve in accordance with the pressure value as corrected by the correction means so as to apply a pressure corresponding to such pressure value to the suspension.

5. Pressure control system according to claim 4 in which the correction means calculates a first compensating value which inversely corresponds to the pressure detected by the pressure detecting means, and multiplies the first compensating value by a correction value which inversely corresponds to a vehicle speed detected by the vehicle speed detecting means to provide a second compensating value, which is added to the pressure value from the command means to derive a corrected pressure value.

6. Pressure control system according to claim 5 in which the first compensating value assumes a relatively high, constant value when the pressure detected by the pressure detecting means is equal to or less than a third predetermined value, assumes a relatively low, constant value when the detected value is equal to or above a fourth predetermined value which is greater than the third value, and assumes a value between the both constant values which is inversely proportional to the pressure detected by the pressure detecting means when the detected pressure is between the third and the fourth value; and wherein the correction value which inversely corresponds to the vehicle speed assumes a relatively high, constant value when the vehicle speed detected by the vehicle speed detecting means is equal to or less than a fifth predetermined value, assumes a relatively small, constant value when the detected vehicle speed is equal to or greater than a sixth predetermined value which is greater than the fifth value, and assumes a value between the both constant values which is inversely proportional to the vehicle speed detected by the vehicle speed detecting means when the detected vehicle speed is between the fifth and the sixth value.

7. Pressure control system for suspension comprising a pressure source for supplying a fluid which is drawn from a reservoir to a high pressure piping under a high pressure which delivers a hydraulic fluid to a suspension which is adapted to extend and shrink in response to a pressure supplied thereto;

a pressure control valve including a line pressure port communicating with the high pressure piping, a low pressure port communicating with a low pressure, an output port for delivering a pressure to the suspension, a target pressure space communicating with the high pressure piping through an orifice, a spool responsive to a pressure from the output port applied to its one end to be driven in a direction to reduce a degree of communication between the line pressure port and the output port and to increase a degree of communication between the low pressure port and the output port and also responsive to a pressure from the target pressure space applied to its other end to be driven in a direction to increase a degree of communication between the line pressure port and the output port and to reduce a degree of communication between the low pressure port and the output port, a valve element for defining a degree of communication between the target pressure space and the low pressure, and electrical drive means for driving the valve element in a direction to increase/decrease the degree of communication;

pressure detecting means for detecting a pressure in the high pressure piping;

command means for commanding a pressure value to be applied to the suspension;

abnormality detecting means for detecting a fault in the detecting operation of the pressure detecting means;

correction means for correcting the pressure value from the command means in accordance with the pressure detected by the pressure detecting means so as to correct the pressure value with a high compensating value when the pressure value is low, and for modifying the compensating value to a given value which is allocated to a predetermined pressure in the high pressure piping whenever the abnormality detecting means has detected a fault in the detecting operation;

and electrical energization means for electrically energizing the pressure control valve in accordance with the pressure value as corrected by the correction means so as to apply a pressure corresponding to such pressure value to the suspension.

8. Pressure control system according to claim 7 in which the correcting means calculates a first compensating value which inversely corresponds to a pressure detected by the pressure detecting means, modifies the first compensating value to a given value which is allocated to a predetermined pressure in the high pressure piping when a fault in the detecting operation is detected by the abnormality detecting means, and adds the first compensating value to the pressure value from the command means to derive a corrected pressure value.

9. Pressure control system according to claim 8 in which the first compensating value which inversely corresponds to the pressure detected by the pressure detecting means assumes a relatively high, constant value when the pressure detected by the pressure detecting means is equal to or less than a third predetermined value, assumes a relatively small, constant value when the detected pressure is equal to or greater than a fourth predetermined value which is greater than the third value, and assumes a value between the both constant values which is inversely proportional to the pressure detected by the pressure detecting means when the detected pressure is between the third and the fourth value.

10. Pressure control system for suspension comprising an onboard pressure source for supplying a fluid drawn from a reservoir to a high pressure piping under a high pressure which delivers a hydraulic fluid to an onboard suspension which is adapted to extend and shrink in response to a pressure supplied thereto;

a pressure control valve including a line pressure port communicating with the high pressure piping, a low pressure port communicating with a low pressure, an output port for delivering a pressure to the suspension, a target pressure space communicating with the high pressure piping through an orifice, a spool responsive to a pressure from the output port applied to its one end to be driven in a direction to reduce a degree of communication between the line pressure port and the output port and to increase a degree of communication between the low pressure port and the output port and also responsive to a pressure from the target pressure space applied to its other end to be driven in a direction to increase a degree of communication between the line pressure port and the output port and to reduce a degree of communication between the low pressure port and the output port, a valve element for defining a degree of communication between the target pressure space and the low pressure, and electrical drive means for driving the valve element in a direction to increase/decrease the degree of communication;

pressure detecting means for detecting a pressure in the high pressure piping;

vehicle speed detecting means for detecting a vehicle speed;

command means for commanding a pressure value to be applied to the suspension;

abnormality detecting means for detecting a fault in the detecting operation of the pressure detecting means;

correction means for correcting the pressure value from the command means in accordance with a pressure detected by the pressure detecting means and a vehicle speed detected by the vehicle speed detecting means by using a compensating value which assumes a high value when the detected pressure is high and which assumes a low value when the detected pressure is high, and for modifying the compensating value to a given value which is allocated to a predetermined pressure in the high pressure piping whenever a fault in the detecting operation is detected by the abnormality detecting means;

and electrical energization means for electrically energizing the pressure control valve in accordance with the pressure value as corrected by the correction means so as to apply a pressure corresponding to such pressure value to the suspension.

11. Pressure control system according to claim 10 in which the correction means calculates a first compensating value which inversely corresponds to a pressure detected by the pressure detecting means, multiplies the first compensating value by a correction value which inversely corresponds to a vehicle speed detected by the vehicle speed detecting means to provide a second compensating value, modifies the second compensating value to a given value which is allocated to a predetermined pressure in the high pressure piping when a fault in the detecting operation is detected by the abnormality detecting means, and adds the second compensating value to the pressure value from the command means to derive a corrected pressure value.

12. Pressure control system according to claim 11 in which the first compensating value assumes a relatively high, constant value when a pressure detected by the pressure detecting means is equal to or less than a third predetermined value, assumes a relatively small, constant value when the detected pressure is equal to or greater than a fourth predetermined value which is greater than the third value, and assumes a value between the both constant values which is inversely proportional to a pressure detected by the pressure detecting means when the detected pressure is between the third and the fourth value; and wherein the compensating value which inversely corresponds to the vehicle speed assumes a relatively high, constant value when a vehicle speed detected by the vehicle speed detecting means is equal to or less than a fifth predetermined value, assumes a relatively small, constant value when the detected vehicle speed is equal to or greater than a sixth predetermined value which is greater than the fifth value, and assumes a value between the both constant values which is inversely proportional to the vehicle speed detected by the vehicle speed detecting means when such vehicle speed is between the fifth and the sixth value.

* * * * *